United States Patent [19]

Nail et al.

[11] Patent Number: 5,838,589
[45] Date of Patent: Nov. 17, 1998

[54] INTRINSICALLY SAFE DATA ACQUISITION SYSTEM AND APPARATUS

[75] Inventors: George Michael Nail, Oklahoma City; Alan Wayne Burkhard, Edmond; Jeffrey Roland Wedekind, Oklahoma City, all of Okla.

[73] Assignee: M-I L.L.C, Houston, Tex.

[21] Appl. No.: 650,458

[22] Filed: May 20, 1996

Related U.S. Application Data

[62] Division of Ser. No. 325,009, Oct. 18, 1994, Pat. No. 5,583,764.

[51] Int. Cl.$^6$ ..................................................... G06F 17/00
[52] U.S. Cl. ..................................................... 364/551.01
[58] Field of Search .......................... 364/514 R, 551.01, 364/482; 220/88.3

[56] References Cited

U.S. PATENT DOCUMENTS

| | | | |
|---|---|---|---|
| 3,973,170 | 8/1976 | Hogan | 317/16 |
| 4,420,840 | 12/1983 | Livermore | 455/606 |
| 4,519,717 | 5/1985 | Jones et al. | 374/17 |
| 4,751,648 | 6/1988 | Sears, III et al. | 364/422 |
| 4,802,502 | 2/1989 | Williams | 220/88.3 |
| 4,813,493 | 3/1989 | Shaw et al. | 173/164 |
| 4,847,602 | 7/1989 | Atland et al. | 340/700 |
| 4,894,748 | 1/1990 | Shefet | 361/380 |
| 4,954,923 | 9/1990 | Hoeflich et al. | 361/111 |
| 5,291,031 | 3/1994 | MacDonald et al. | 356/5 |
| 5,333,088 | 7/1994 | Sweet | 359/144 |
| 5,335,730 | 8/1994 | Cotham, III | 166/374 |
| 5,519,527 | 5/1996 | Panton | 359/159 |
| 5,583,764 | 12/1996 | Nail et al. | 364/420 |

OTHER PUBLICATIONS

Canadian Standards Association; *Instrinsically Safe and Non–Incendive Equipment for Use in Hazardous Locations*; C22.2 No. 157–M1987; May 1987 (pp. 1–26).

Canadian Standards Association; *Process Control Equipment*; C22.2 No. 142–M1987; May 1987 (pp. 1–34).

Canadian Standards Association; *Non–Incendive Electrical Equipment for Use in Class 1, Division 2 Hazardous Locations*; C22.2 No. 213–M1987; Mar. 1987 (pp. 1–27).

Canadian Standards Association; *Hazardous Locations —A Guide for the design, Construction, and Installation of Electrical Equipment*; John Bossert et al; M9W 1R3; 1986 (pp. 37–44).

*Primary Examiner*—Ellis B. Ramirez
*Attorney, Agent, or Firm*—Conley,Rose & Tayon, P.C.

[57] ABSTRACT

An intrinsically safe data acquisition system is disclosed for use in hazardous locations. The system includes a driller's console that itself is intrinsically safe and includes a large LCD monitor, keypad and local CPU. The system further includes satellite data acquisition and processing boxes that are also intrinsically safe and that are located within the hazardous area. Each satellite box includes its own CPU and acquires and locally processes signals received from a number of field sensors. The satellite box converts the signals into digital form, and transmits the data via a fiber optic communication channel to a master CPU box located in an unclassified area. A high current intrinsically safe barrier distributes power from the master CPU box to the satellite box for powering all the sensors supported by that satellite box. Another such barrier distributes all the power required by the driller's console.

15 Claims, 21 Drawing Sheets

① CLIP PIN 10 ON P11 OFF FLUSH WITH PLASTIC HOLDER
② WIRE WRAP JUMPERS AS FOLLOWS:
   A: WIRE WRAP PINS
   B: NO WIRE WRAP
   C: NO WIRE WRAP
   D: WIRE WRAP PINS
   E: NO WIRE WRAP
③ CLIP PIN 4 ON P4 OFF FLUSH WITH PLASTIC HOLDER.
④ REMOVE I.C. AND REPLACE WITH ITEM 2.
⑤ REMOVE JUMPER FROM P14.

⟨1⟩ ADD MEMORY CHIPS ITEM 2 TO LOCATIONS U2,U3,U4 & U5.
⟨2⟩ UNSODER I.C. U8 & REPLACE WITH ITEM 3 & 4
⟨3⟩ WIRE WRAP PINS:  1-2 ON W1
　　　　　　　　　　1-2 ON W2
　　　　　　　　　　1-2 ON W3
　　　　　　　　　　1-2 ON W4
　　　　　　　　　　1-2 ON W5

⟨4⟩ REMOVE HEADER J4.
⟨5⟩ CLIP PIN 19 ON J3 OFF FLUSH WITH PLASTIC HOLDER.

INTRINSICALLY SAFE DATA ACQUISITION SYSTEM AND APPARATUS

This is a divisional of application Ser. No. 08/325,009 filed on Oct. 18, 1994 now U.S. Pat. No. 5,583,764.

FIELD OF THE INVENTION

The present invention relates generally to communication and control systems for use in monitoring and controlling various systems and equipment in industrial environments. More particularly, the invention relates to systems and apparatus for providing communications between, and a distribution of a control voltage to, equipment and devices located in areas that are classified as hazardous due to the presence of explosive vapors or dust. Still more particularly, the invention relates to intrinsically safe monitors and other apparatus housing a CPU and associated electronics that are located in class 1, division 1 locations.

BACKGROUND OF THE INVENTION

At locations where oil or gas wells are being drilled, a number of flammable gases may be present, including mixtures of oxygen, methane, ethane, propane, hydrogen sulfide and others. Similar potentially dangerous environmental conditions exist in locations in which petroleum products are being recovered, refined or processed. Likewise, in industrial areas where large quantities of dust are present, such as in grain handling facilities or pulp and paper mills, hazardous environmental conditions may exist. Standardized classifications for the various types of hazardous locations have been adopted and assigned by regulatory agencies according to the nature and type of hazard that is generally present or that may occasionally be present.

Because electrical components, by their nature, may generate heat and sparks sufficient to ignite a flammable gas or other flammable mixture under even normal operating conditions, such components must be carefully selected and installed when used in an area that is classified as hazardous. More specifically, the components must exceed certain minimum standards as to such characteristics as power consumption, operating temperature, current and voltage requirements, and energy storage capabilities. These standards are also established by regulatory authorities and vary depending upon the particular hazardous environment.

Certain electrical devices are intrinsically safe. An intrinsically sale device may be generally described as a device that during normal operation, as well as operation during any fault condition, cannot cause a spark or achieve a temperature sufficient to ignite the gas or other substance that is present and that causes the area to be classified. If a device is not intrinsically safe, other means must be provided to ensure that the device cannot serve as a source of ignition. Typically where a device is not intrinsically safe, it may be made safe by housing it in an explosion proof enclosure, or by enclosing the device in some other type of enclosure and purging the enclosure with "clean" air. An explosion proof box or enclosure is one that will prevent any explosion that might occur within the box from causing the atmosphere outside the box to ignite. Purging an enclosure with a continuing source of clean air prevents the air that is laden with the hazardous substance from entering the box, such that a spark or elevated temperature of the component within the box cannot ignite the hazardous atmosphere.

Although areas that are classified as hazardous are prevalent in many industries, the problems of powering and communicating with electrical devices in hazardous areas are particularly acute in the drilling industry. In drilling a well, a great deal of equipment is located in close proximity to the well head, including mud pumps, compressors, mud pits and other subsystems associated with drilling. Many of these areas around a drilling site are classified as hazardous, and thus special precautions are required with respect to the electrical communication and power distribution systems. To efficiently and safely control the drilling operation, the driller will require a system having sensors positioned in a number of locations in the hazardous area. These sensors will transmit needed data to a computer which can process that data and transmit important information to the driller by means of a driller's console or monitor. By viewing the information on the driller's monitor, the driller can then make whatever changes are appropriate to the system to assure safe and continuing operation.

The driller's monitor is typically required to be very close to the well head and thus is located in a hazardous area. Historically, driller consoles have varied with respect to the amount of information displayed and type of indicators used. In the past, when a simple meter or gage provided all the information that was required, the device could sometimes be made intrinsically safe. However, due to the sophistication of today's drilling practices, consoles or monitors usually must provide a driller with a tremendous amount of information concerning the location and orientation of the drill bit, the mud flow rates, downhole pressures, a well as the status of the other systems supporting the drilling operation. Additionally, the console must permit the driller to issue commands or make inquiries through the use of a keyboard or key pad, and must display all the needed information by means of a CRT or other sophisticated monitor. These modern driller's consoles or monitors have a substantial power requirement that has prevented them from being made intrinsically safe, and that requires that they be housed in an explosion proof or a purged enclosure. Due to its size and extreme weight, an explosion proof enclosure is typically not practical for large consoles. Accordingly, is has been the usual practice to house today's monitor in a purged enclosure.

There are several distinct and significant disadvantages associated with this conventional practice. First, purged air is typically supplied in a form that includes an oil mist that has been added to the system to assure proper operation of air compressors. The oil mist is both a nuisance and, over time, can have a detrimental effect on the electronic components. Additionally, and significantly, purge air has often proved to be unreliable due to various mechanical failures. When the purge air is lost, the system must automatically be shut down to avoid the possibility of ignition of flammable gases. The driller has a tremendous financial investment in the operation at the drilling site such that even a short shutdown is extremely costly.

Furthermore, purge air systems require the installation of piping from the air source to the monitor, and to other devices receiving the purged air. This investment is one that the driller would prefer not to make because it typically will be removing its equipment and personnel from the drilling site after a relatively short length of time. Thus the semi-permanent nature of installing pipe, the extra time involved in installing the piping, and the additional monitoring and backup equipment necessary to ensure the integrity of the purged air system are all costly additional investments the driller would prefer to avoid if an alternative was available.

Additional drawbacks or compromises exist or are required in the conventional data acquisition systems currently used by drillers. As mentioned above, various sensors are positioned about the drilling site in hazardous locations. Electrical conductors, which provide power and a communication means to and from the sensors, are routed from each sensor to a junction box which is also located in the hazardous area. These junction boxes receive power from and communication signals to and from another box that is located outside the hazardous area and which includes an intrinsically safe barrier (ISB) for each of the sensors interconnected through that box. Conventional ISBs limit the current and voltage that is conducted to a sensor to ensure that the power reaching the sensor is not of a magnitude that might permit the device to ignite the atmosphere in the hazardous area. Using this conventional system, one ISB is required for each sensor. Accordingly, it is typical practice to interconnect each junction box with the box containing the ISBs by means of a relatively bulky and expensive multiconductor cable. Likewise, another multiconductor cable typically interconnects the box containing the IBSs to a computer or other central controller which is located outside the hazardous area.

As is obvious, the conventional arrangement thus described is again costly and time consuming to install. First, a substantial number of ISBs will be required given that a typical drilling system may monitor twenty or more different parameters. Further, the multiconductor cables interconnecting the ISB box to the central controller and to the various junction boxes are relatively heavy and bulky. It can be time consuming and difficult to route and install the required conduit and the pull the cables in the installed conduits.

Further, the driller's equipment is typically used sequentially in a number of separate jobs such that it is installed, dismantled and reinstalled on a fairly frequent basis. Accordingly, running piping for purge air, routing and locating bulky and heavy multiconductor cables and conduits, and handling and installing heavy explosion proof enclosures is typically not practical and, at a minimum, undesirable.

Additional drawbacks to conventional data acquisition systems also exist. Due to the nature of a drilling site, the field sensors and cables are typically installed in an electrically noisy environment. Even with shielding, the multiconductor cables are vulnerable to stray noises generated in the area and, until the desired signals reach the central controller outside the hazardous area, there is generally no means provided for filtering or conditioning the signals. Finally, given that conventional systems merely retrieve field-generated signals and transmits them all to the central controller for processing, the central controller may be heavily loaded with tasks associated with data processing and calculation.

Accordingly, despite the fact that there currently exists workable data acquisition systems for use in and about hazardous environments, there remains a need for safe, less cumbersome and low cost means for acquiring and manipulating data from the various sensors. More specifically, an intrinsically safe driller's monitor, one not requiring an explosion proof enclosure or purge air and the significant drawbacks associated with such a system, would be particularly welcomed by the industry. Furthermore, a system which could provide power to the various sensors and acquire data therefrom without requiring the conventional number of ISBs would be a significant advance in this technology. Also, a system which would reduce the communication system's susceptibility to electrical noise and that would be less burdensome and costly to install, dismantle and transport would be especially welcomed by the drilling industry.

SUMMARY OF THE INVENTION

Accordingly, there is provided herein an intrinsically safe date acquisition system for use in areas classified as hazardous due to the presence of ignitable vapors, dust or the like. The invention generally includes a master CPU box that is located outside the hazardous area for distributing power to the other system components. An intrinsically safe satellite box is located within the hazardous area for redistributing power to, and collecting signals from various sensors that are located in the hazardous area. The invention further includes an intrinsically safe console, including monitor, that is located within the hazardous area for communicating with the master CPU box. A barrier box is included in the system and located outside the hazardous area for receiving power from the master CPU box and safely redistributing the power to the intrinsically safe satellite box and console.

The intrinsically safe console preferably includes a monitor having a large format LCD screen and a data input device, such as a keypad or keyboard. The console includes an onboard micro-controller and communication circuitry allowing the operator using the console to communicate with the master CPU box, preferably via fiber-optic cable. Because of the low power requirements of the console, an explosion proof or purged housing or enclosure is not required. The console is intrinsically safe for Class 1, Division 1, Groups C and D, locations.

The satellite box of the present invention is an intrinsically safe data collection and processing center. The satellite box transmits power to the total of up to 10 analog and digital sensors. The box receives the signals from the sensors and converts them to digital form for transmission to the master CPU box via a single communication channel, preferably a fiber-optic conductor. The satellite box preferably includes an on-board CPU for converting the analog signals to digital, processing those signals, deriving calculated data, and transmitting that data outside the hazardous area. The box further includes signal conditioning means for the received analog and digital signals, as well as independent voltage regulating means for each sensor. The box is intrinsically safe for Class 1, Division 1, Groups C and D locations.

The present invention eliminates the need for expensive and heavy explosion proof enclosures for consoles and boxes that are to be located in hazardous areas. The invention also eliminates the need for installing permanent or semi-permanent piping for supplying purged air to such enclosures. Further, the invention permits an operator in the hazardous area to visually monitor a large amount of data and to effectively communicate with a master CPU box located outside a hazardous area. Furthermore, the local processing of data within the satellite box and transmitting that data via a single communication channel eliminates the need for bulky and expensive multi-conductor cables otherwise required for sending individual signals to the master CPU box outside the hazardous area. Additionally, the invention eliminates the previously existing problem of electrical noise being induced in the long, multiconductor cable runs, eliminates the number of intrinsically safe barriers traditionally required to safely operate a data acquisition system within a hazardous area, and further relieves the master CPU box from certain data processing duty.

Thus, the present invention comprises a combination of features and advantages which enable it to substantially advance the area of technology concerning data acquisition and communications within hazardous areas. These and various other characteristics and advantages of the present

DESCRIPTION OF THE PREFERRED EMBODIMENT

It is frequently necessary to monitor and control various electrical systems and subsystems that are located partially or totally within hazardous areas, such as those where explosive vapors may be present. The present invention discloses a data acquisition, communication and control system that may safely be employed in such hazardous areas, the system as a whole, and specific subsystems themselves, being intrinsically safe. The invention has particular utility when used on a drilling site to interconnect the driller's monitor, a central or master controller and various sensors that are located throughout the drilling site. Accordingly, the preferred embodiment of the present invention will be described with reference to employing the invention on a drilling site; however, it is to be understood that the invention is not limited to such applications, but instead is broadly applicable to any of a myriad of situations where computers, monitors and sensors are to be located in areas classified as hazardous.

Figure 1:
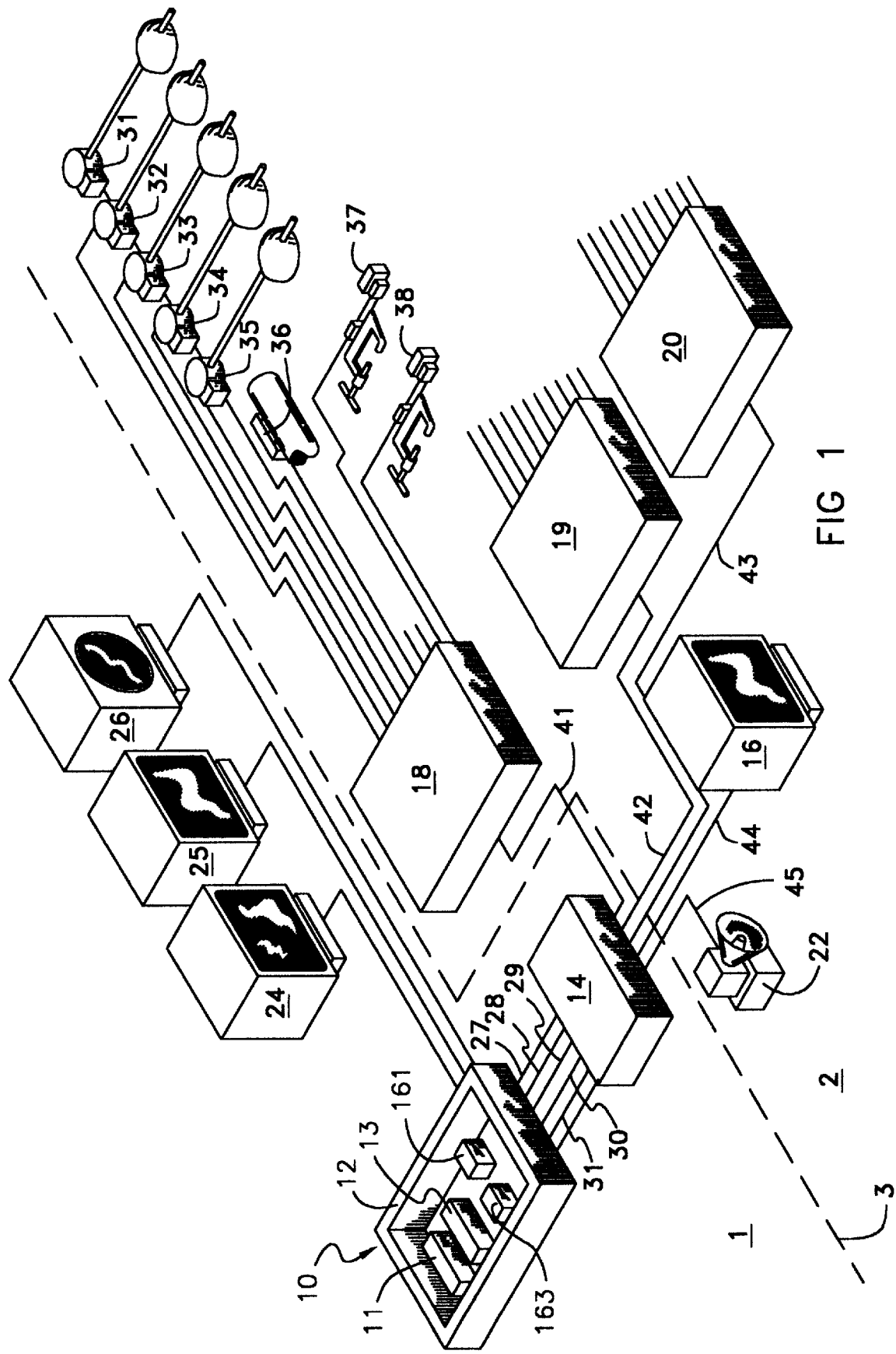
FIG. 1 is a block diagram showing, in schematic form, the elements comprising the data acquisition system of the present invention.

Referring now to FIG. 1, the intrinsically safe data acquisition system (DAS) 10 of the invention is generally shown. DAS 10 generally includes a central or master CPU box 12, a barrier box 14, an intrinsically safe driller's monitor 16, and one or more intrinsically safe satellite boxes 18–20. Additionally, DAS 10 includes an intrinsically safe audible alarm, such as horn 22 and any number of intrinsically safe sensors such as sensors 31–38.

The drilling site includes an unclassified or nonhazardous area 1 and a hazardous area 2, the dividing line between such areas being generally depicted in FIG. 1 by dashed line 3. Areas are classified according to the presence or likely presence of explosive vapors. The standards for such areas are established by the American Petroleum Institute (API) and are published in the API "Recommended Practices for Classification of Locations for Electrical Installations at Petroleum Facilities," API Recommended Practice 500 (RP500), First Edition, Jun. 1, 1991, specifically incorporated herein by this reference. In a typical drilling site, hazardous area 2 typically may be classified as a Class 1, Division 1, Groups C and D hazardous location due to the likely presence of hydrogen sulfide. Other Group D gases may also be present. Other gases in Group D include benzene, butane, ethane, gasoline, methane, propane and others. A complete listing of Group C and D gases is included in Article 500 of the National Electric Code Handbook, Sixth Edition, based on the 1993 Edition of the National Electric Code, published by the National Fire Protection Association, the entire disclosure of Article 500 being hereby specifically incorporated by this reference. As shown in FIG. 1, sensors 31–38, satellite boxes 18–20, horn 22 and driller's monitor 16 are all physically located within the hazardous area 2. Accordingly, driller's monitor 16, satellite boxes 18–20, sensors 31–38 and horn 22 are all intrinsically safe. By contrast, master CPU box 12 and barrier box 14 are located in unclassified area 1 and therefore are not required to be intrinsically safe. Optional displays or monitors 24, 25 and optional circular recorders such as recorder 26 shown in FIG. 1 are also located in unclassified area 1 and thus likewise need not be intrinsically safe.

The driller's monitor 16, satellite boxes 18–20 and the 15 volt, 5 ohm high current ISBs 62 which is described in detail below and which assists in distributing power from the master CPU box 12) have each been certified as intrinsically safe and non-incendive for use in hazardous locations in accordance with Canadian Standards Association ("CSA") Standard No. C22.2 No. 157-M1987. The ISBs 62, driller's monitor 16 and satellite boxes 18–20 have received the certification by the CSA for class 1, division 1, group C and D locations. The CSA certifications are acceptable by all United States and Canadian regulatory bodies, including for example, the U.S. NFPA and the U.S. Coast Guard. The standards for electrical equipment being certified intrinsically safe and non-incendive are set out in the standards as published in May 1987 by the CSA, 178 Rexdale Boulevard, Rexdale, (Toronto) Canada M9W1R3. The standard is entitled "C22.2 No. 157-M1987 Intrinsically Safe and Non- Incendive Equipment for Use in Hazardous Locations, Consumer and Commercial Products forming part of Canadian Electrical Code, Part II Safety Standards for Electrical Equipment, ISSN0317-5669," the entire disclosure of which is incorporated herein by this reference. The CSA has also published additional standards relating to non-incendive equipment for use in class 1, division 2 hazardous locations. Such standards include various charts and tables showing ignition temperatures and currents and voltages that may ignite explosive vapors of various types and which relate to Standards C22.2 No. 157-M1987 regarding Intrinsically Safe and Non-Incendive Equipment. Accordingly, also incorporated herein by this reference is the CSA's standard C22.2 No. 213-AM1987 entitled "Non-Incendive Electrical Equipment for Use in Class 1, Division 2 Hazardous Locations—Industrial Products Forming Part of Canadian Electrical Code, Part II Safety Standards and Electrical Equipment" published in March 1987 by the Canadian Standards Association.

System Overview

Before describing the various apparatus, subsystems and features of the present invention in greater detail, a general overview of the system is provided. In general, to monitor and control modern, sophisticated drilling equipment, a variety of sensors 31–38 are employed to detect and communicate various parameters to master CPU box 12. Such sensors are typically located in or near the various pumps, compressors, drilling fluid (mud) pits and tanks. Such sensors are interconnected with intrinsically safe satellite box 18. Although not shown, a number of other sensors would likewise each be interconnected with satellite box 19 or 20.

The signals generated by the various field sensors must be communicated to master CPU box 12. The signals from each group of sensors are collected by their respective satellite box 18–20. Each satellite box 18–20, which may collect both analog and digital signals from its respective sensors, converts all the received analog signals to digital, and then transmits those digital signals and any calculated data through barrier box 14 to master CPU box 12 via fiber optic cables. Each satellite box 18–20 includes a CPU for data processing and thus relieves master CPU box 12 of some of the data processing burden.

The barrier box 14 includes intrinsically safe barriers (ISBs), sometimes referred to as "current barriers" or "zener barriers." Barrier box 14 includes a separate intrinsically safe barrier for driller's box 16, horn 22 and each satellite box 18–20. The intrinsically safe barriers ensure that the power distributed to each of these peripherals is at a current level and voltage level that will not ignite the hazardous vapors.

The power to operate all the components of DAS 10 is supplied from master CPU box 12. That power is then distributed to driller's monitor 16, horn 22 and satellite boxes 18–20 through barrier box 14. Master CPU box 12 also distributes power to the optional displays 24–26; however, such power distribution need not pass through barrier box 14 since these monitors are located in unclassified area 1.

Driller's monitor 16 includes an LCD display, keypad and local CPU for use in communicating with master CPU box 12. Communications between intrinsically safe monitor 16 and master CPU box 12 likewise are conducted through barrier box 14 via fiber optic cables as described more fully below.

Sensors

Typical sensors for use in the DAS 10 of the present invention include up to eight mud pit probes, two trip tank probes, a flow paddle and three pump stroke rate detectors, all of which are intrinsically safe. If all the above-identified devices are employed in the DAS 10, the system will require two satellite boxes 18 and 19 as shown in FIG. 1. Any analog sensor may be connected to any analog channel in any satellite box. Likewise, any digital sensor can be connected to any digital channel of any satellite box.

In other applications, a variety of additional sensors may be desirable. Thus, depending upon the total number of sensors, a third satellite box 20 may be required. Particularly desirable additional sensors include sensors indicating tool depth, rotary RPM, hookload, pump pressure, casing pressure, hydraulic rotary torque and electric rotary torque. With these seven additional sensors, a myriad of other calculated parameters can be locally derived within satellite boxes 18–20 and then transmitted to master CPU box 12.

Satellite Box

Referring again to FIG. 1, the satellite box 18–20 is an intrinsically safe, microprocessor controlled, data acquisition module having a temperature code T3C for Class 1, Division I, Groups C and D, hazardous locations as set out in Table 2 in CSA standard C22.2 No. 157-M1987. Because of its intrinsically safe certification, including the requisite spark ignition and thermal ignition testing set out in C22.2 No. 157-M1987, neither the satellite box nor any of its components are capable of igniting a Group C or D gas in normal use, or under any conditions of fault likely to occur in practice. At an ambient temperature of 40° C., the maximum surface temperature of components in satellite box 18–20 under fault conditions is 160° C.

Each satellite box 18–20 is capable of supporting eight analog channels (either voltage or current transmitter) and two digital channels. Effectively then, each satellite box can transmit power and communication signals to and from up to ten different sensors 31–38. The satellite box is sensor unspecific in that it has the ability to utilize any presently available and commonly employed sensors. All analog channels include a two point calibration means. All digital channels are high end calibratable.

As previously mentioned, the satellite box 18–20 is interconnected and communicates with the master CPU box 12 through the barrier box 14. This communication is accomplished by means of composite cables 41–43 comprising three electrical conductors, two fiber optic conductors, a drain and a shield.

Each satellite box is rated intrinsically safe by the Canadian Standards Association and contains a stand-alone CPU. The satellite box receives power via ISB's housed in the barrier box 14. The power is conditioned onboard to maintain the intrinsically safe characteristics, as well as to remove any electrical contamination (noise) that may have been introduced in transmission from the master CPU box to the satellite box.

The parameters sensed by sensors 31–38 are communicated electrically from the sensors to the satellite box CPU. All conversion of signals from analog to digital is done in the satellite box. Rates and accumulation of digital inputs are processed within the satellite box. The satellite box's onboard CPU microcontroller converts the sensed values into a digital data stream and, upon being polled by the master CPU box 12, transmits the acquired and converted data serially from the hazardous area to the master CPU box via the barrier box 14 and fiber optic conductors in cables 41–43.

The details regarding satellite boxes 18–20 are best understood with reference to FIGS. 2–5 and associated Table 5. Because boxes 18–20 are identical, a description of box 18 will describe all such boxes.

Figure 2:
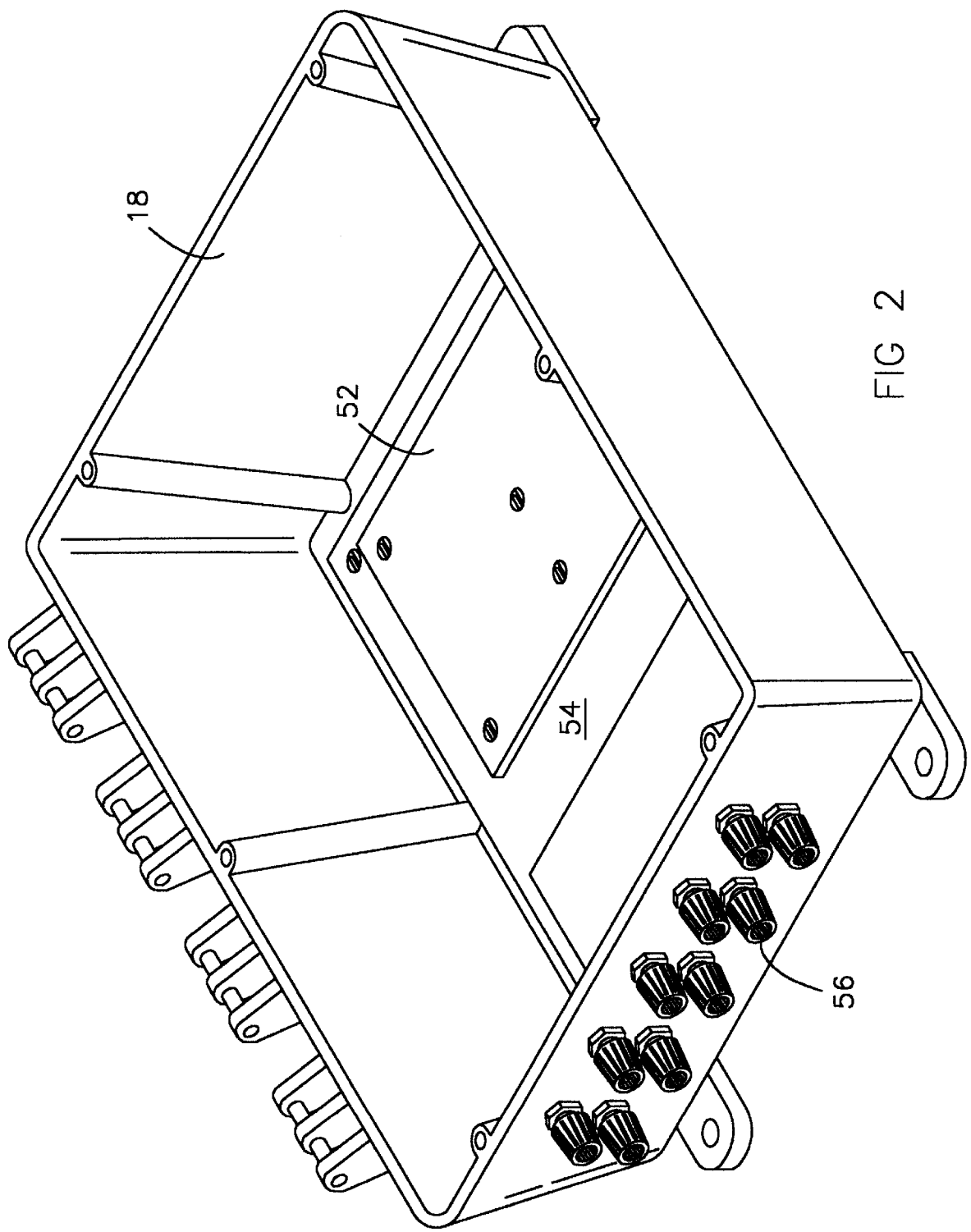
FIGS. 2 and 3 are front and side views, respectively, of the satellite box shown in FIG. 1.
Figure 3:
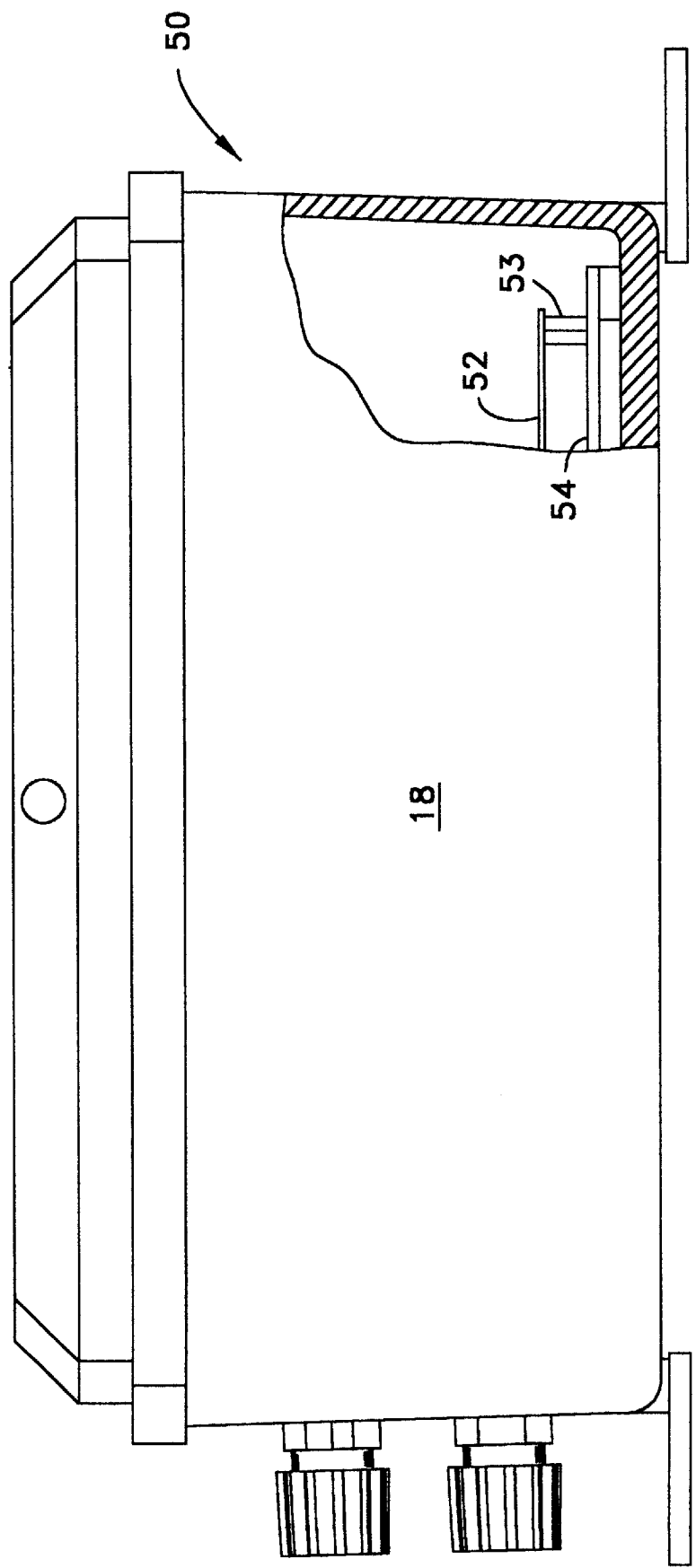

Referring to FIGS. 2 and 3, box 18 generally includes a hinged enclosure 50. The enclosure 50, and the enclosures for master CPU box 12, barrier box 14, intrinsically safe monitor 16, are all preferably made of blown fiberglass and are EMI shielded by an internal nickel-based coating. Such enclosures may be supplied by Carlon, A Lamson & Sessions Company, and are all NEMA 4x rated.

The satellite box enclosure 50 houses satellite PCB 52 (sometimes referred to as a data acquisition board) which is mounted by four standoffs 53 from the enclosure's mounting plate 54 which is located in the rear portion of the box. The larly situated on board 52 to ensure that satellite box 18 is intrinsically safe. More specifically, the board 52 includes no large capacity capacitors or inductors. Further, the various components are selected such that none are capable of igniting vapors that may be present in the hazardous area 2, either by virtue of either temperature or sparking at either normal or fault conditions.

Figure 5A:
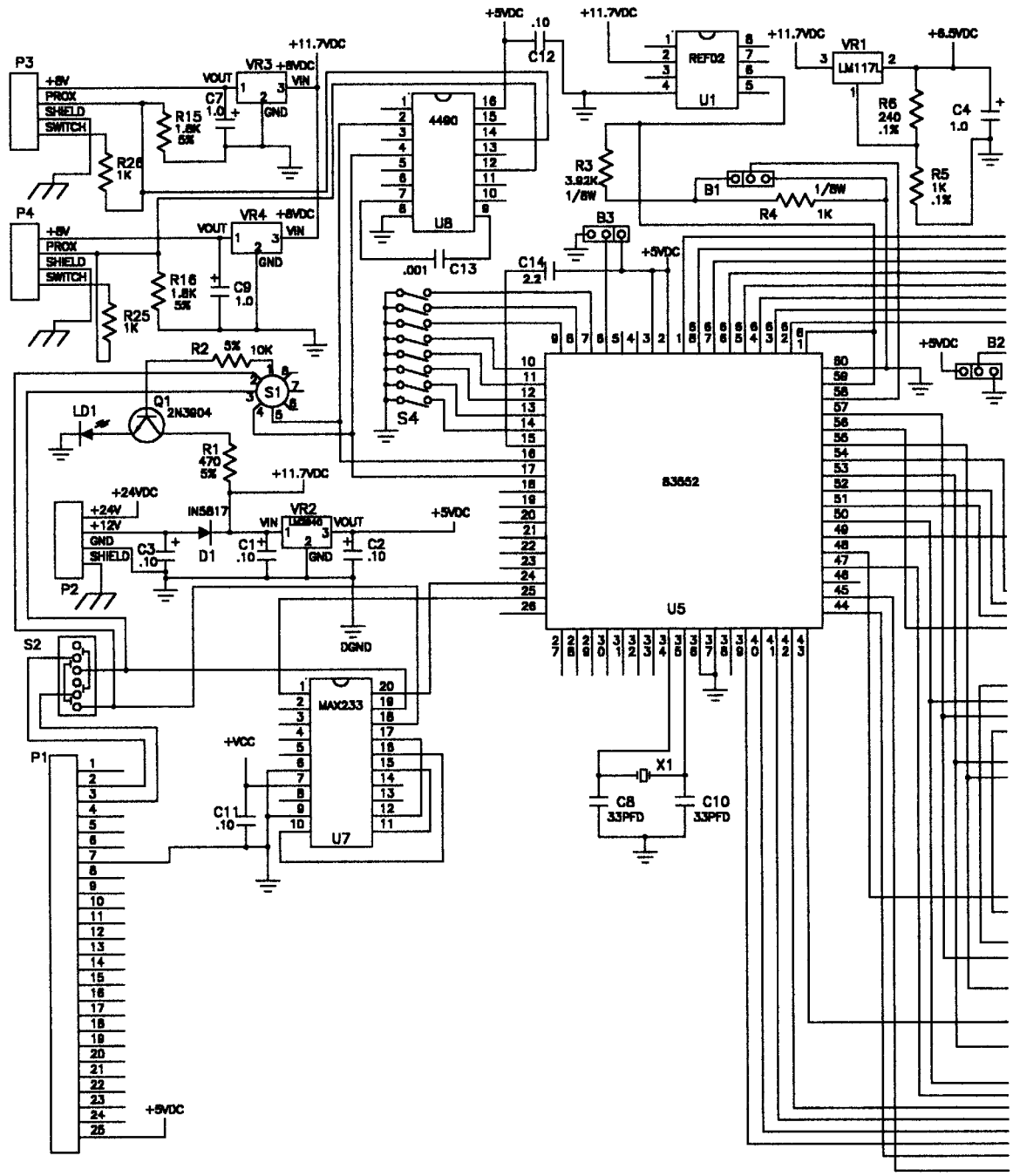
FIG. 5A–5B are electrical diagrams, in schematic form, showing the interconnection of the various components of the satellite PCB shown in FIG. 4.
Figure 5B:
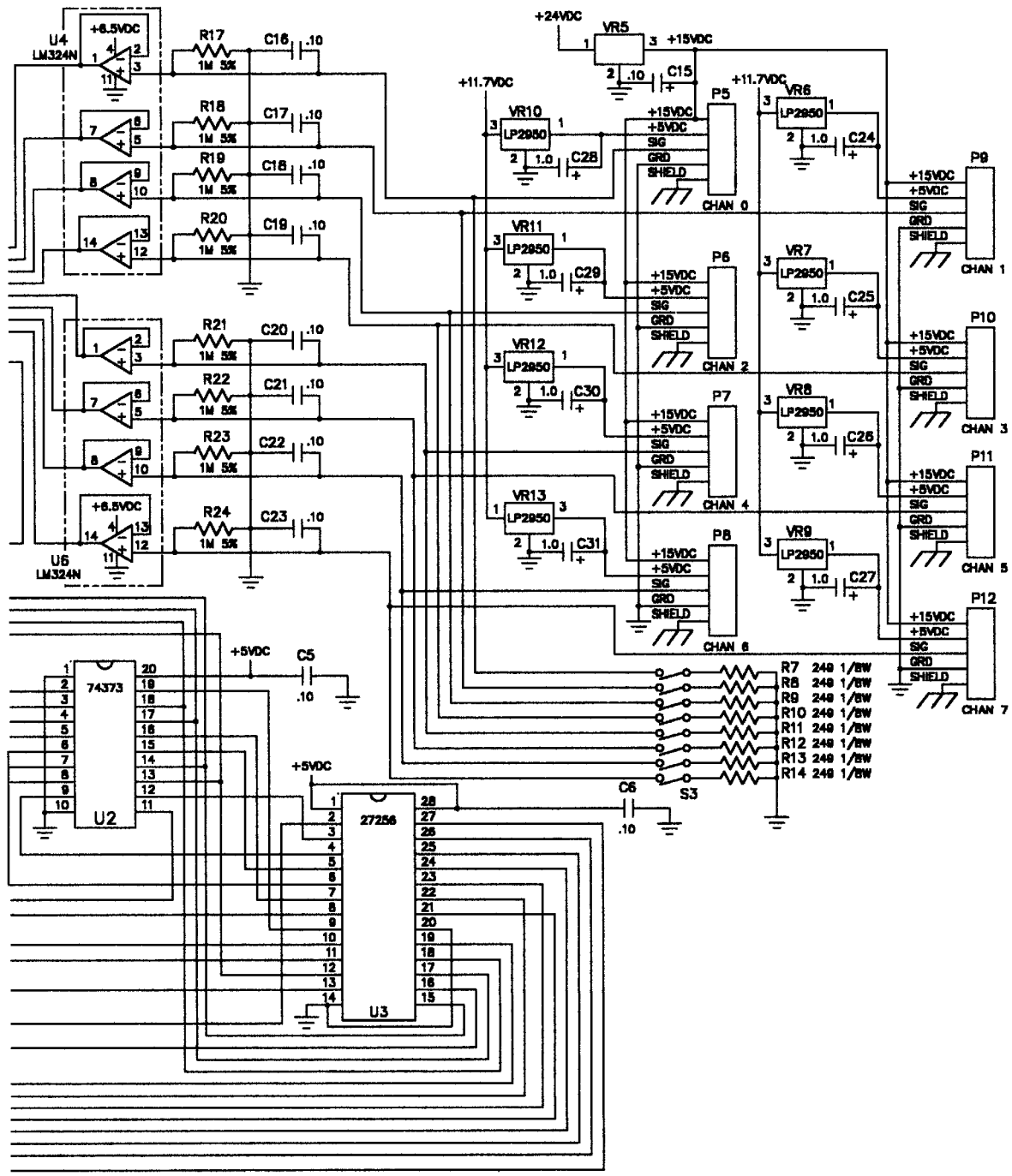

Referring now to FIGS. 5A–5B and its associated Table 5, satellite PCB 52 will be described in more detail.

TABLE 5

| DESIGNATOR | QTY | NO. | PART NO. | DESCRIPTION | MAIL REOD |
|---|---|---|---|---|---|
|  | 1 | 50 | LSS00017 | BAG STATIC SHIELDING 10 × 12 ANTI-STATIC FOAM | 1 |
|  | 5 | 49 | YML00020 | TERMNL UNINS TEST PT. .090 | 5 |
|  | 1 | 48 | YKH99020 | JUMPER BERG STICK 65474-001 | 1 |
|  | 1 | 47 | YMP00032 | SOCKET IC 8 PIN | 1 |
|  | 2 | 46 | YMP00010 | SOCKET IC 14 PIN | 2 |
|  | 1 | 45 | YMP00011 | SOCKET IC 16 PIN | 1 |
|  | 2 | 44 | YMP00076 | SOCKET IC 20 PIN | 2 |
|  | 1 | 43 | YMP00080 | SOCKET IC 28 PIN | 1 |
|  | 1 | 42 | 68-65-075 | SOCKET IC 68 PIN SQUARE PLCC | 1 |
|  | 8 | 41 | 65-90-506 | TERMNL BLOCK PCB CONN 5 PIN | 8 |
|  | 3 | 40 | 65-90-497 | TERMNL BLOCK PCB CONN PLUGGABLE 4 PIN | 3 |
|  | 1 | 39 | YKH99030 | BERG STICK 3 POSITION | 1 |
| P5–P12 | 8 | 38 | 65-05-025 | CONNECTOR 5 PIN HEADER SHROUDED PCB MNT | 8 |
| P2,P3,P4 | 3 | 37 | 65-04-015 | CONNECTOR 4 PIN HEADER SHROUDED PCB MNT | 3 |
| P1 | 1 | 36 | 65-25-010 | TERMNL BLOCK CONNECTOR 25 PIN D PCB MNT MALE | 1 |
| VR6–VR13 | 8 | 35 | 67-23-367 | IC LM2950ACZ VOLTAGE REGULATOR 5 V LOW POWER | 8 |
| VR5 | 1 | 34 | 67-23-336 | IC LM78M15CT VOLTAGE REGULATOR 15 V | 1 |
| VR3,VR4 | 2 | 33 | 67-95-025 | IC TK1168 VOLTAGE REGULATOR 8 V LOW DROPOUT | 2 |
| VR2 | 1 | 32 | 67-23-366 | IC LM2940 VOLTAGE REGULATOR 5 V LOW DROPOUT | 1 |
| VR1 | 1 | 31 | 67-23-355 | IC LM117L VOLTAGE REG ADJ | 1 |
| U8 | 1 | 30 | YJE00008 | IC MC14490P HEX BOUNCE ELEMINATOR 4490 | 1 |
| U7 | 1 | 29 | 67-95-513 | IC RS232 LINE DRIVER/RECEIVER SP233 | 1 |
| U5 | 1 | 28 | 67-95-795 | IC 80C552 MICRO CONTROLLER 10 BIT A/D | 1 |
| U4,U6 | 2 | 27 | YJA00040 | IC LM324N QUAD OP-AMP LOW PWR | 2 |
| U3 | 1 | 26 | 96-65-030 | SOFTWARE J-BOX SATELLITE | 1 |
| U2 | 1 | 25 | 67-95-780 | IC TRANSPARENT LATCH 74HCT373 | 1 |
| U1 | 1 | 24 | 67-05-700 | IC REF-02 VOLTAGE REFERENCE | 1 |
| S3,S4 | 2 | 23 | YSL11101 | SWITCH DIP ROCKER 8 PST 200 V MDRR-4-185 | 2 |
| S2 | 1 | 22 | 75-79-020 | SWITCH DPDT PCB MNT 300 MA 125 V | 1 |
| S1 | 1 | 21 | 75-78-060 | SWITCH SPST ROTARY PCB MNT 500 MA 125 V | 1 |
| X1 | 1 | 20 | YBA11050 | CRYSTL 11.0592 MHZ E1105 | 1 |
| D1 | 1 | 19 | YDE04020 | DIODE IN5817 SCHOTTKY 1 AMP 20 V | 1 |
| LD1 | 1 | 18 | 68-15-010 | LED GREEN RECT | 1 |
| O1 | 1 | 17 | 74-78-833 | XSISTR 2N3904 MOTOROLA | 1 |
| C14 | 1 | 16 | W05001157 | CAPCTR 2.2 MFD 50 V KEMET | 1 |
| C13 | 1 | 15 | YCG31004 | CAPCTR .001 MFD FILM ± 10% 18F2246 | 1 |
| C8,C10 | 2 | 14 | YCC33305 | CAPCTR 33 PF 50 V RECT CERAMIC | 2 |
| C2,C3,C5,C6,C11,C12,C15–C23 | 15 | 13 | 61-50-007 | CAPCTR .10 MFD 100 V | 15 |
| C1,C4,C7,C9,C24–C31 | 12 | 12 | YCA30100 | CAPCTR 1 MFD 35 V TANT 47F404 | 12 |
| R25,R26 | 2 | 11 | YRA14122 | RESIST ¼ W 1200 OHM 5% | 2 |
| R17–R24 | 8 | 10 | 72-05-139 | RESIST ¼ W 1M OHM 1% RN55D A/B | 8 |
| R15,R16 | 2 | 9 | 72-06-576 | RESIST ¼ W 1.8K OHM 5% CARBON | 2 |
| R7–R14 | 8 | 8 | 72-03-059 | RESIST ⅛ W 249 OHM 1% METAL FILM | 8 |
| R5 | 1 | 7 | 72-04-073 | RESIST ¼ W 1000 OHM .1% METAL FILM | 1 |
| R6 | 1 | 6 | 72-04-058 | RESIST ¼ W 240 OHM .1% METAL FILM | 1 |
| R4 | 1 | 5 | YRG82013 | RESIST ⅛ W 1000 OHM 1% | 1 |
| R3 | 1 | 4 | YRG82392 | RESIST ⅛ W 3920 OHM 1% | 1 |
| R2 | 1 | 3 | YRA14103 | RESIST ¼ W 10000 OHM 5% | 1 |
| R1 | 1 | 2 | YRA14471 | RESIST ¼ W 470 OHM 5% | 1 |
|  | 1 | 1 | 96-52-105 | PCB BLANK | 1 | lower end of the box includes ten cable connectors 56 which provide means for receiving and connecting the electrical cables that are routed between satellite box 18 and field sensors 31–38.

Figure 4:
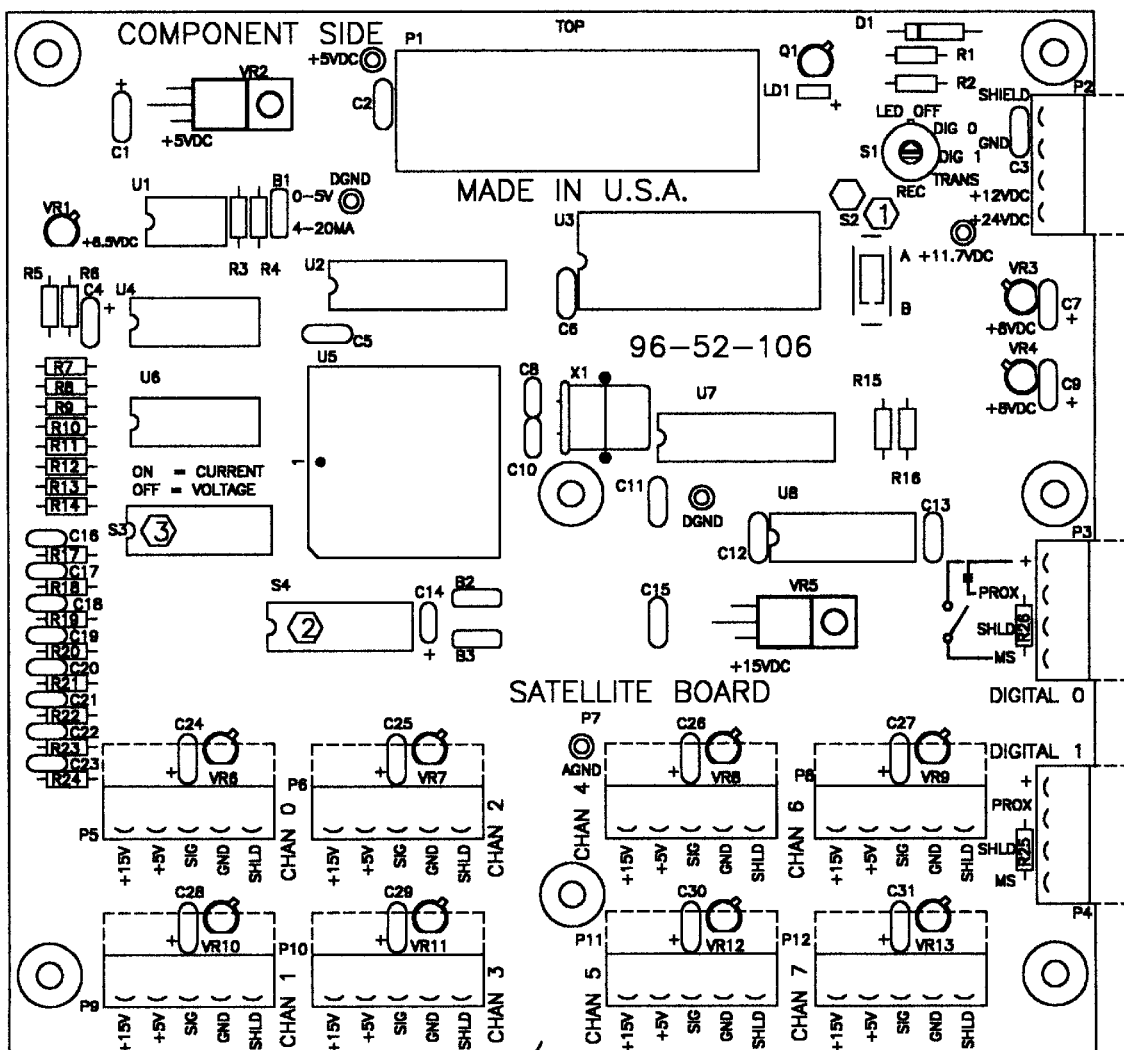
FIG. 4 is a plan view of the satellite PCB housed in the satellite box shown in FIGS. 2 and 3.

Satellite PCB 52 is best shown in FIG. 4 which shows the physical layout of the components supported by the board which are shown and identified more particularly in FIG. 5 and the associated Table 5. These components are particu- Satellite box 18 includes a 10-bit microcontroller U5 having an internal analog to digital converter. The preferred microcontroller is an integrated circuit model number IC80C552 manufactured by Phillips Semiconductors. Connectors P5–P15 interconnect sensors 31–38 and microcontroller U5 and thus provide pins for providing power to and the return signal from sensors 31–38. The voltage supplied to each sensor 31–38 is regulated by a dedicated 5 volt, low power, voltage regulators V6–V13. Additionally, with respect to the 15 volt signal which some sensors may require, a single 15 volt regulator VR5 is provided. Separate voltage regulation on the 5 volt supply was provided to ensure that in the event one circuit to a sensor was damaged or shorted, the satellite box 18 could continue to supply power to and monitor the remaining sensors which would be unaffected. VR6–VR13 are preferably ICs manufactured by National Semiconductor Corporation, having Model No. LM2950ACZ which essentially have internal short circuit protection which will automatically return power to the field sensor once the fault or disturbance has been removed. Without separate such voltage regulators VR6–VR13, the 5 volt power to and return signal from each sensor 31–38 would be lost even in the event that only one field cable to one sensor had been damaged. It is anticipated that primarily 5 volt sensors will be employed in the field. Accordingly, the redundant voltages regulation of the 15 volt signals has not been provided, although optionally may be and, where the cost was justifiable, preferably would be provided.

For sensors employing 15 volt supply, typically those that generate 4 to 20 milliamp signals, dropping resistors R7–R14 are provided to give a voltage signal in the 1–5 volt range that microcontroller U5 can accept.

Satellite PCB 52 includes signal conditioning circuitry to filter noise from all signals returning from field sensors 31–38. The conditioning circuitry can bias the returning signals to provide a full 0 to 5 volt signal to microprocessor U5. The signal conditioning means includes quad op amp, low power integrated circuits U4 and U6 such as Part No. LM324N as supplied by National Semiconductor Corporation. Voltage regulator VR1 is provided in the signal conditioning circuitry in order to generate a 6.5 volt signal to aid in biasing or expanding the range of signals so that the microprocessor will receive the full 0 to 5 range. This signal conditioning circuitry further includes resistors R17–R24 and capacitor C16–C23 as shown in FIG. 5 adjacent to op amps U4 and U6.

The code or operating instructions for microcontroller U5 is stored in a read only memory, preferably an EPROM such as designated as U3 in FIG. 5. Preferably microcontroller U5 runs strictly from instructions provided by EPROM U3. Latch U2 is provided between microcontroller U5 and EPROM U3 as bus control and as an address control for microprocessor U5.

The signals received from digital field sensors are received at P3 and P4. Voltage regulators VR3 and VR4 ensure that 8 volts are provided to the sensors. U1 is a voltage regulator which supplies 5 volts DC to the microcontroller U5 and to a hex bounce eliminator (digital debouncer) U8 such as Model No. MC14490P as manufactured by Motorola, Inc. The debouncer U8 rejects digital noise returning with the signal provided by whatever digital sensors are located in the field. Again, VR3 and VR4 separately supply 8 volts to the digital sensors to prevent a fault or disturbance on the cable servicing one sensor from causing a loss of power to and signal from the other digital sensor.

For system integrity, it is preferred that various components or circuits on the satellite PCB 52 be provided with separate voltage regulators which are positioned as close as possible to the circuit being supplied so as to decrease the possibility that radiated or induced noise from rig equipment will disrupt or hamper communications within DAS 10. Although separate voltage regulators are preferred, a single 5V, 8V and 15 volt regulator could be used instead to power all circuitry on PCB 52.

The digital field sensors may include proximity switches or a simple mechanical make-or-break switch. Such sensors may be used to pick up mud pump piston strokes. Such information can be recorded in the microcontroller U5 arid accumulated for transmission to master CPU box 12. Additionally, using the acquired and accumulated data various calculations can be made within microcontroller U5, such as pump rpm, which again can be transmitted to CPU box 12.

Rotary switch S1 is an 8-position switch that, in conjunction with transistor Q1 and LD 1 provide a troubleshooting feature enabling an operator to select various positions and obtain a visual indication of data transmission into or away from the PCB 52.

Power into satellite PCB 52 is supplied at connector P2 from composite cable 41 which carries both the 24 volt and 12 volt supply from the barrier box 14. The nominal 12 volt supply is conducted to diode D1 which prevents reverse flow. Depending on the length of the conductors and the other resistances in the system, board 52 is supplied with a DC voltage of about 9 to 11 volts after dropping through D1. FIG. 5 indicates an 11.7 volt DC signal which is the highest or best case voltage.

U7 is an RS232 line driver/receiver to enable communications between microcontroller U5 and master CPU box 12 (FIG. 1) Preferably U7 is an IC as manufactured by Sipex Corporation, Part No. SP233EP. P1 is a 25 pin male connector on which is mounted a communication module 58 described below, the communication module 58 converting the electrical signals to the fiber optic signal for communication with a similar communications module in master CPU box 12. The communication module 58 is normally set to receive and convert RS232 signals. In the event that other applications require a different communication protocol, such as RS485 or 422, switch S2 effects a change so that signals transmitted to pin 2 and received at pin 3 of connector P1 will be reversed, such that the signals will be instead transmitted to pin 3 and received at pin 2.

Figure 6:
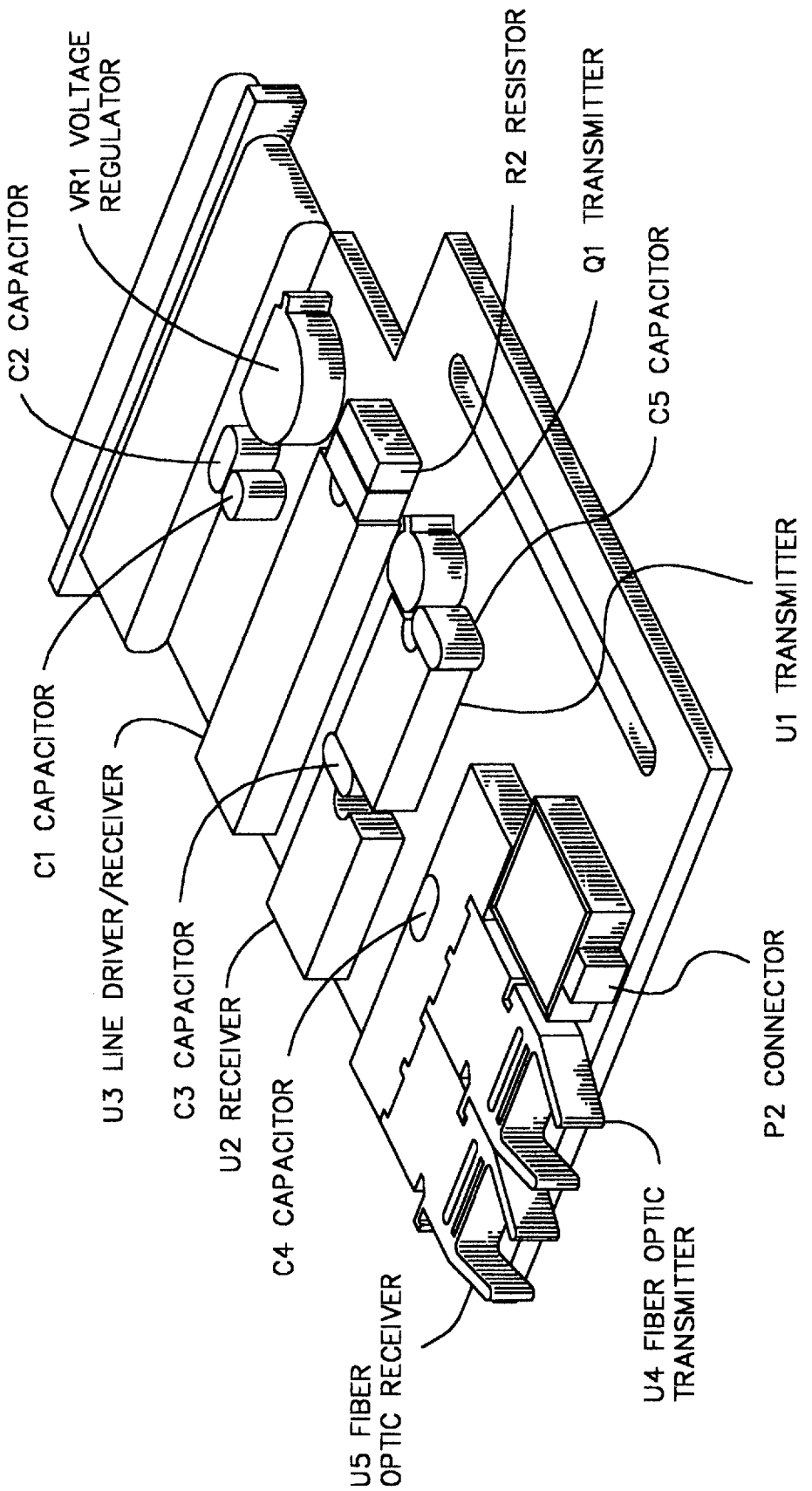
FIG. 6 is a plan view of the communication module PCB that is connected to the satellite PCB shown in FIG. 4.
Figure 7:
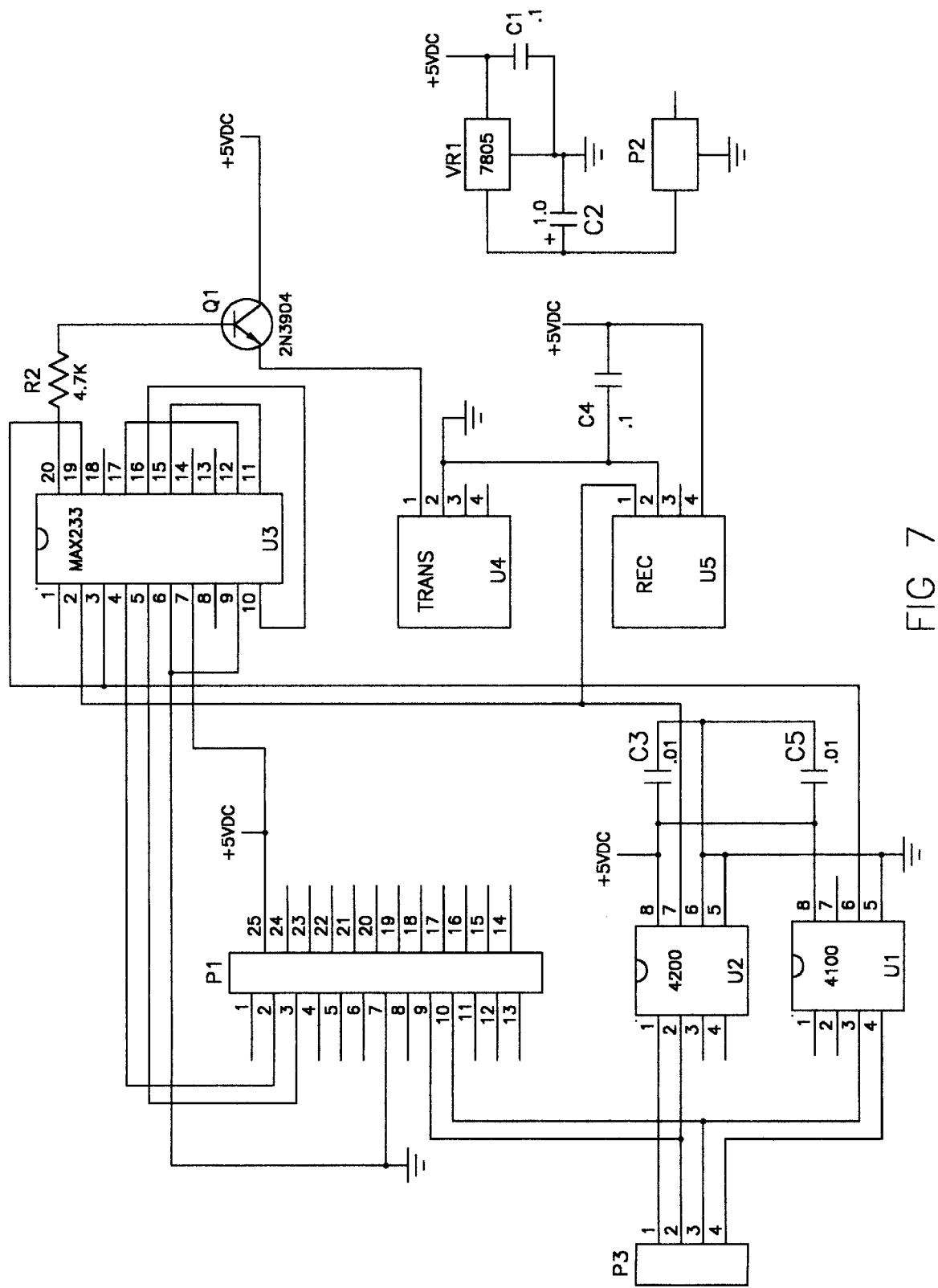
FIG. 7 is an electrical schematic showing the interconnections of the components mounted on the PCB shown in FIG. 6.

FIGS. 6 and 7, along with Table 7, depict and describe communication module 58.

TABLE 7

| DESIGNATOR | QTY | QTY | NO. | PART NO. | DESCRIPTION | MAIL REOD |
|---|---|---|---|---|---|---|
|  | 1 | 1 | 17 | LSS00016 | BAG STATIC SHIELDING 8 × 12 FOAM/MACKPAC |  |
| U5 | 1 |  | 16 | 70-80-065 | RECIVR FIBER OPTIC PCB MNT HORIZ 49K BD PLASTIC |  |
| U4 | 1 |  | 15 | 70-65-065 | XMITER FIBER OPTIC PCB MNT HORIZ 40K BD PLASTIC |  |
|  |  | 1 | 14 | 65-90-506 | TERMNL BLOCK PCB CONNECTOR PLUGGABLE 5 PIN |  |
| R2 | 1 |  | 13 | YRA14472 | RESIST 4700 OHM ¼ W 6% |  |
|  |  |  | 12 |  |  |  |
| C1 | 1 | 1 | 11 | YCA30100 | CAPCTR 1 MFD 35 V TANT 47F404 |  |
| C2–C5 | 4 | 4 | 10 | 61-50-007 | CAPCTR 100 V .1 MFD KEMET C33OC104MICUICA |  |
| VR1 | 1 | 1 | 9 | 67-23-367 | IC LM2950ACZ VOLTAGE REGULATOR 5 V LOW POWER |  |
| O1 | 1 |  | 8 | 74-78-833 | XSISTER 2N3904 MOTOROLA |  |

TABLE 7-continued

| DESIGNATOR | QTY | QTY | NO. | PART NO. | DESCRIPTION | MAIL REOD |
|---|---|---|---|---|---|---|
| U1 |  | 1 | 7 | 70-65-020 | XMITER CURRENT LOOP OPTICALLY COUPLED 20 MA |  |
| U2 |  | 1 | 6 | 70-60-020 | RECIVR CURRENT LOOP OPTICALLY COUPLED 20 MA |  |
| U3 | 1 | 1 | 5 | 67-95-513 | IC RS232 LINE DRIVER/RECEIVER |  |
| P3 |  | 1 | 4 | 65-05-025 | CONCTR 5 PIN HEADER SHROUDED PCB MNT |  |
| P2 |  | 1 | 3 | 65-01-001 | CONCTR 1 PIN PCB RA MICRO-D JAX |  |
|  | 1 | 1 | 2 | 85-25-015 | CONCTR 25 PIN D FEM W/WIRE WRAP TAXS |  |
|  | 1 | 1 | 1 | 96-52-123 | PCB BLANK D-CONN COM MOD |  |

Communication module 58 includes a 25 pin female plug, designated on FIG. 7 as P1, which engages male plug P1 shown in FIG. 5. Communication module 58 includes fiber optic cable connectors U4 and U5 for transmitting and receiving, respectively, the desired data along fiber optic conductors contained in composite cable 41. Transmitter and receiver current loops U1 and U2, respectively, and RS232 line driver/receiver U3, in conjunction with transistor Q1, allow fiber optic communication to be conducted between master CPU box 12 and satellite box 18. VR1 is a low power, 5 volt, voltage regulator which may be identified to those designated as VR6–VR13 previously described with respect to FIG. 5.

Barrier Box

The barrier box 14 houses intrinsic safety barriers to distribute power to the driller's monitor 16, the satellite boxes 18–20, the audible alarm 22, and, ultimately, to the various sensors which are located in hazardous locations. Communications from barrier box 14 to these peripherals is via fiber optic cable which provides both safety and an electrical noise, insensitive communication means.

Figure 8:
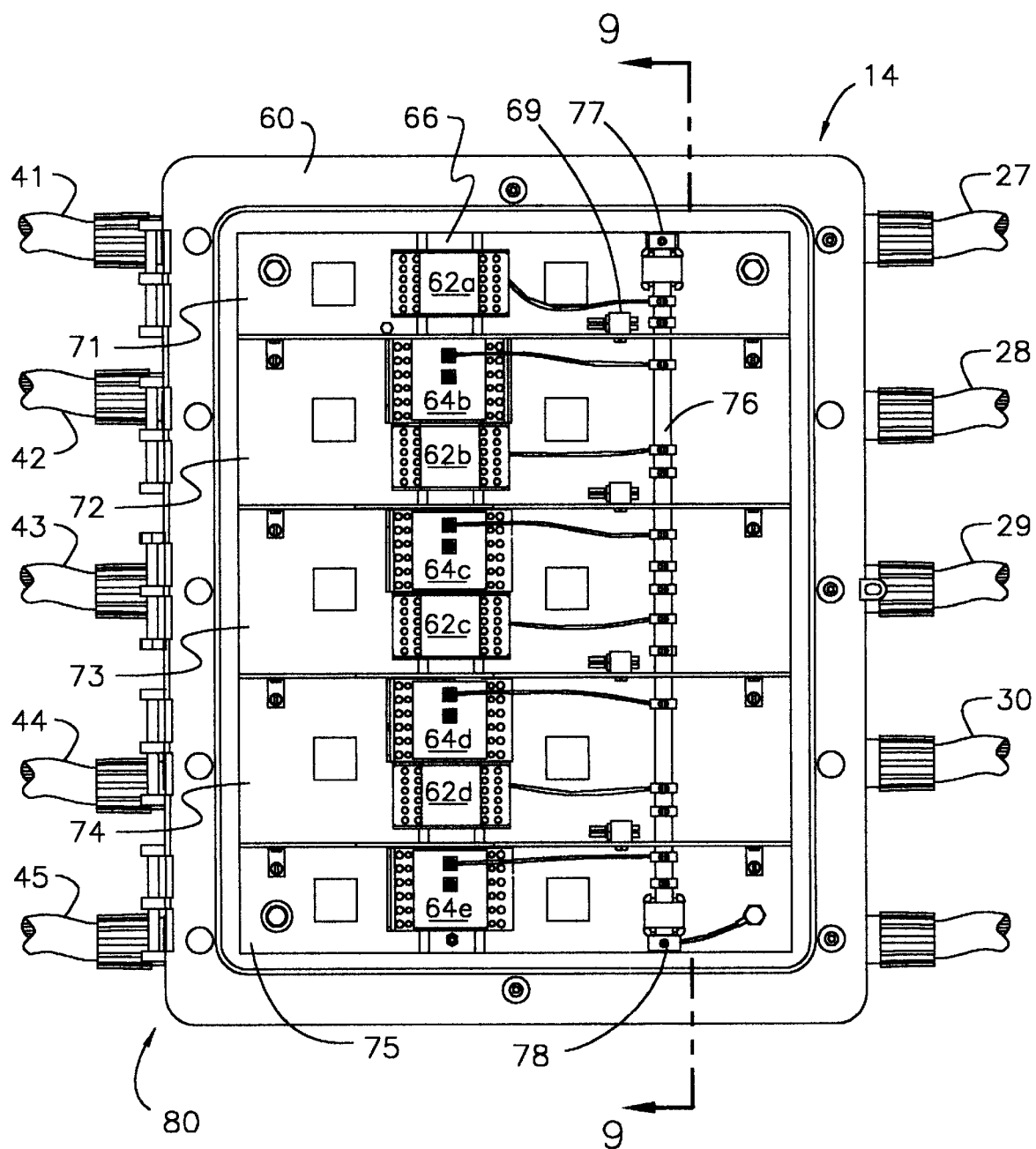
FIG. 8 is a front view of the barrier box shown in FIG. 1 with a portion of the cover cut away to show the intrinsically safe barriers and other internal components.
Figure 9:
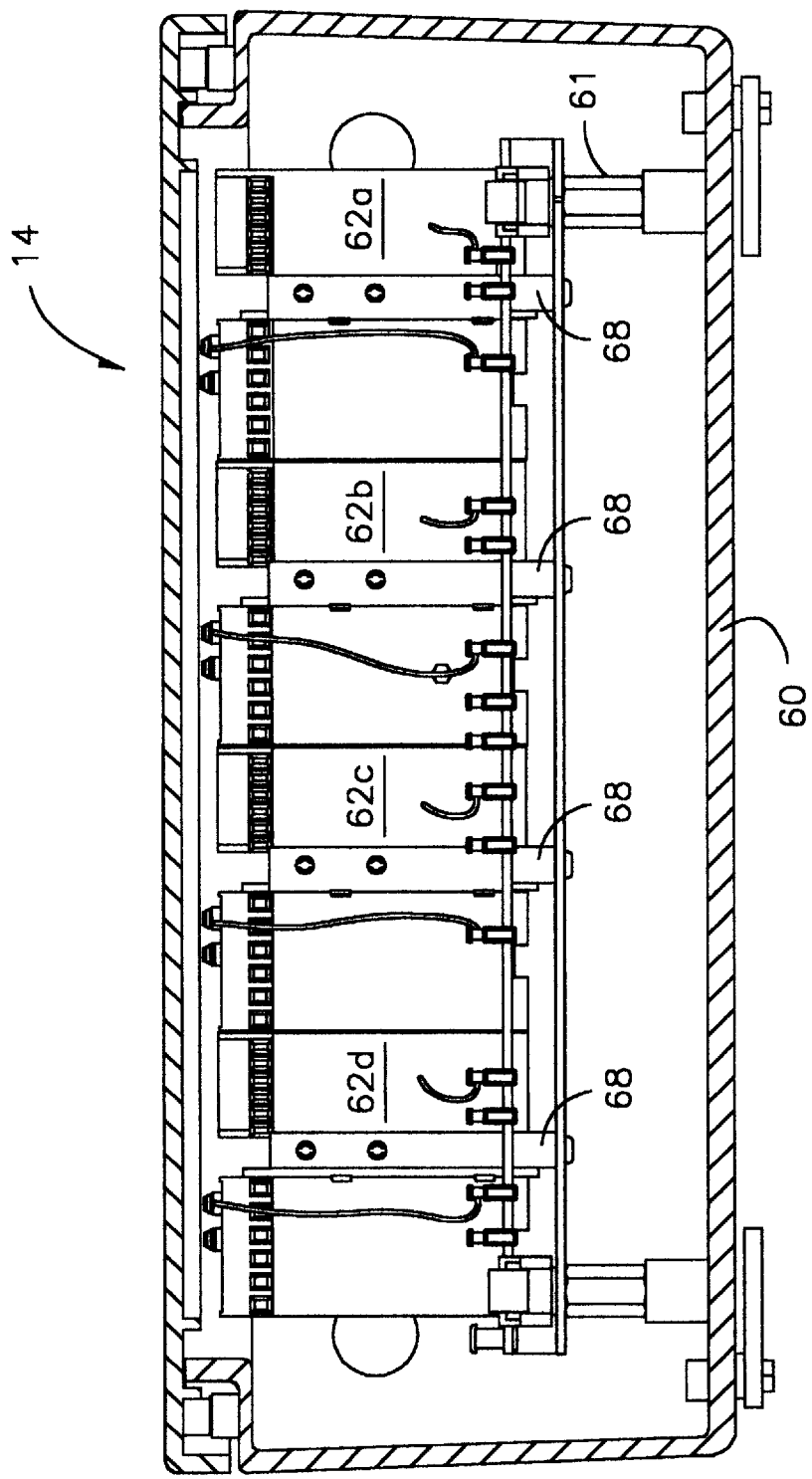
FIG. 9 is a section view of the barrier box shown in FIG. 8 taken along line 9—9.

Barrier box 14 is best shown in FIGS. 8 and 9. Barrier box 14 includes enclosure 60 which is again a blown fiberglass shielded, hinged NEMA 4x enclosure. In the preferred embodiment, enclosure 60 houses four high current, 15 volt, 5 ohm intrinsically safe barriers 62, and four 25.5 volt, 328 ohm maximum intrinsically safe barriers 64.

The high current ISB 62 is a 15 volt/5 ohm barrier certified intrinsically safe by the Canadian Standards Association (CSA) and by Underwriters Laboratories (UL). Such a high current ISB is preferably Model No. WE77-111/Ex manufactured by Peppral & Fuchs, Inc. located in Twinsburg, Ohio 44087-2202. Each high current ISB provides power to a separate intrinsically safe peripheral. More specifically, one 15 volt/5 ohm ISB 62 is included to power the intrinsically safe driller's monitor 16. Up to a total of three intrinsically safe satellite boxes 18–20 can then be separately powered by the three remaining high current ISBs 62. The high current ISB provides a means of delivering a relatively large amount of power into an area that has been classified as hazardous, but provides that power at safe levels.

The barrier box 14 also includes four conventional 25.5 volt/328 ohm intrinsically safe barriers 64 for supplying 24 volts DC power to satellite boxes 18–20. Preferably, ISBs 64 are manufactured by Elcon Instruments, Inc., Model No. MB4/2/18+/F2. These barriers 64 provide a means for powering various other 4–20 milliamp sensors which require a higher voltage than can be supplied with the high current barriers 62.

The driller's monitor 16 and each satellite box 18–20 are each separately connected to the barrier box 14 by a dedicated composite cable 41–44 (test shown in FIGS. 1 and 8) which includes both including electrical conductors and fiber optic conductors. More specifically, each composite cable 41–44 includes three 18-gauge copper electrical conductors and two fiber optic conductors. These cables also each include a continuous electrical shield and a drain wire. A suitable cable for this application is manufactured by Storm Products Company, and assigned Part No. 060992-6. One fiber optic conductor in each cable is provided to transmit signals from the master CPU box 12 to the interconnected peripheral. The second conductor is provided to transmit a signal from the peripheral to the master CPU box 12.

Intrinsically safe barriers 62 and 64 are mounted in the enclosure on a mounting rail 66. Four nonconductive divider plate supports 68 generally divide the enclosure into five separate chambers 71–75. A fiber optic cable connector 69 is retained in each chamber 71–74 and is mounted to a divider plate support 68. Connectors 69 are used to interconnect the fiber optic conductors in composite cables 41–44 with corresponding conductors in identical composite cables 27–30 (FIGS. 1 and 8) which interconnect barrier box 14 and master CPU box 12.

The barrier box enclosure 60 generally has what is referred to as an intrinsically safe side 80 and a nonintrinsically safe side 82. Power from the master CPU box 12 enters enclosure 60 of barrier box 14 on the nonintrinsically safe side 82. The composite cables 41–44 servicing the intrinsically safe driller's monitor 16 and satellite boxes 18–20 which are located in the hazardous area connect with enclosure 60 of barrier box 14 on the intrinsically safe side 80. A nickel plated, copper bus bar 76 which is approximately 10×3 mm is supported in enclosure 60 by terminals 77, 78 adjacent the nonintrinsically safe side 82. The ground wire 95 from each ISB 62, 64 is connected to bus bar 76 as shown.

Figure 10:
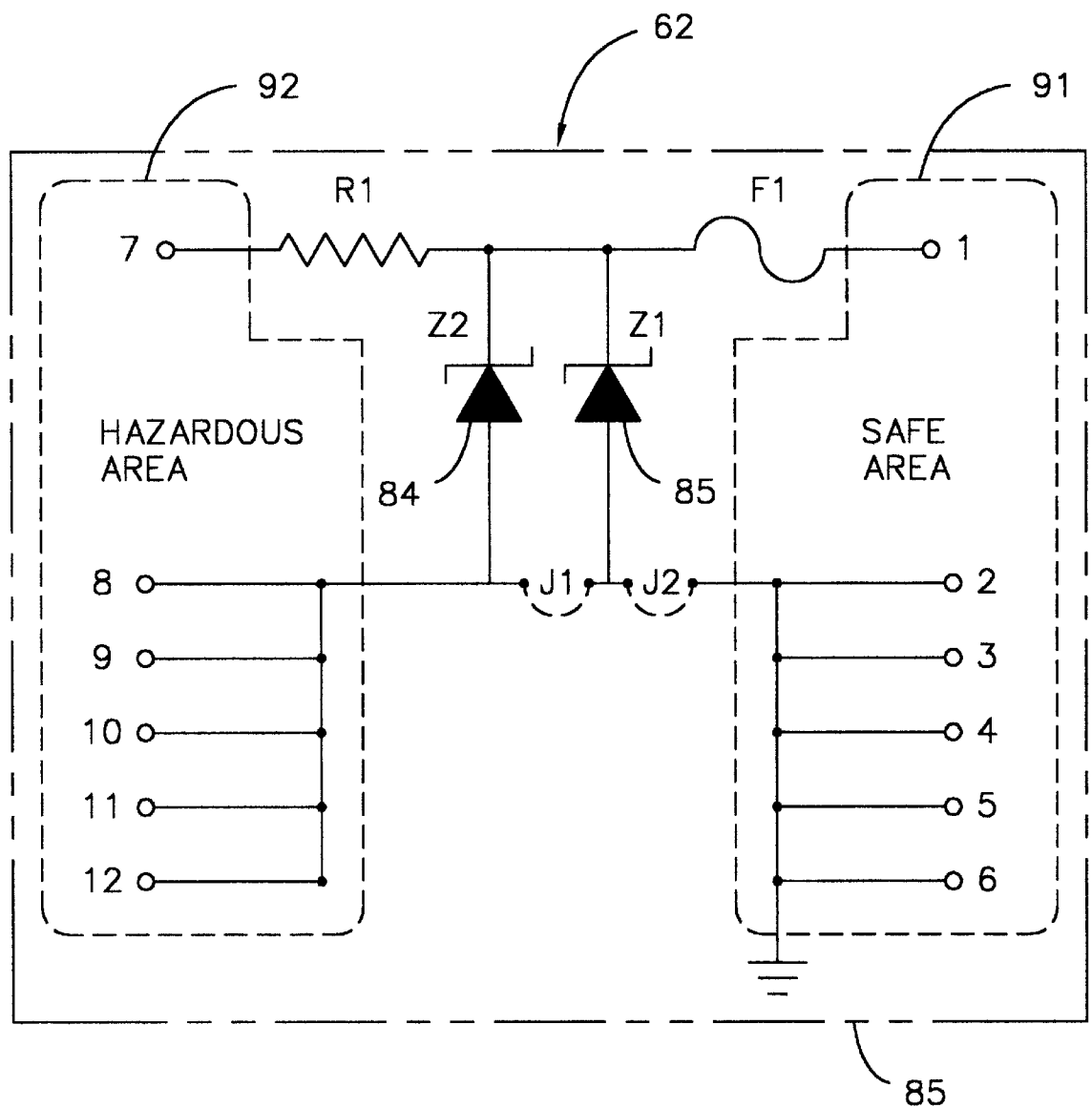
FIG. 10 is a schematic diagram showing the components of the high current intrinsically safe barrier employed in the barrier box shown in FIGS. 8 and 9.

High current intrinsically safe barrier 62 is best understood with reference to FIG. 10. ISB 62 generally includes an enclosure 94 housing a pair of identical zener diodes 84, 85 rated at 13 volts±5%, 50 watts DO-5 as supplied by Solid State, Inc., Part No. 1N3312B. ISB 62 further includes a wirewound resistor, RCD 272F, 5 ohms±1%, 10 watts, Peppral & Fuchs Part No. P00583, and a fast acting fuse rated 500 milliamps as supplied by Belling Lee, Part No. HRC L754/PCB (also designated as Peppral & Fuchs Part No. P00582). These components are interconnected as shown in FIG. 10 with terminal blocks 91 and 92 and the free space in the enclosure 94 is filled with a potting compound, preferably as elastomer type compound, such as that manufactured by Stycast, Inc., Part No. FT2850. Terminal block 91 is positioned on the nonintrinsically safe side of ISB 62 that faces the nonintrinsically safe side 82 of box 60, while terminal block 92 faces the intrinsically safe side 80. As known to those skilled in the art, when connected as shown in FIG. 10, this intrinsically safe barrier 62 will operate to clamp the voltage available to the circuits connected to the intrinsically safe side of the barrier to 13 volts±5%. In normal operating conditions, with voltages below the breakdown voltage of the zener diodes 84, 85, the diodes appear as an open circuit and thus do not conduct current. Should the voltage supplied to the ISB 62 from master CPU box 12 exceed the breakdown voltage of these zener diodes, the diodes quickly become a short circuit to conduct the current to ground for all voltages above the breakdown point, thereby maintaining the voltage on the intrinsically safe side of the barrier to the permitted voltage levels. While one diode 84 would be sufficient for this function, to provide redundancy and thus greater reliability, a second zener diode 84 is supplied. It is preferred that ISB 62 also include provisions for mounting a third and even a fourth such zener diode in parallel with diodes 84 and 85 for even greater safely assurances.

Referring again to FIGS. 1 and 8, composite cable 44 interconnects intrinsically safe barrier 62*a* with driller's monitor 16. Cables 41 through 43 interconnect intrinsically safe barriers 62*b* and 64*b* with their respective intrinsically safe satellite boxes 18–20. Cable 45, which may include only electrical conductors, interconnects intrinsically safe barrier 64*e* with intrinsically safe horn 22. On the nonintrinsically safe side of barrier box 14, cable 27 interconnects intrinsically safe barrier 62*a* with master CPU box 12. Similarly, composite cables 28–30 interconnect their respective intrinsically safe barriers 62, 64 with master CPU box 12. Cables 28–30 are all composite cables comprising a pair of fiber optic conductors and three electrical conductors, a shield and drain wire. Cable 27, which supplies only 12 volts DC to driller's monitor 16, may be identical to cables 28–30, but only requires a pair of electrical conductors.

Driller's monitor

The driller's monitor 16 includes an IBM XT class computer modified so as to have exceptionally low power requirements. The driller's monitor 16 includes a large format LCD screen, 640×400 resolution, and a membrane type keypad. The driller's monitor also includes a monitor interface board which includes an onboard microcontroller, and power conditioning devices and circuitry to meet the intrinsically safe certification requirements. Driller's monitor 16 has a Temperature Code T3C for Class 1, Division I, Groups C and D hazardous locations as set out in Table 2 in CSA standard C22.2 No. 157-M1987. Because of its intrinsically safe certification, including the requisite spark ignition and thermal ignition testing set out in C22.2 No. 157-M1987, neither the monitor nor its components are capable of igniting a Group C or D gas in normal use, or under any conditions of fault likely to occur in practice. At an ambient temperature of 40° C., the maximum surface temperature of components in monitor 16 under fault conditions is 160° C. The monitor interface board further includes communication circuitry allowing the driller's monitor 16 to communicate with the master CPU box 12 via fiber optic cable. As previously mentioned, the fiber optic cable provides for electrical isolation and eliminates the need for several conductors as are normally required for electrical communications. The fiber optic conductors are also totally immune to electrical noise which is prevalent in the hostile environment in which the equipment operates. Because of the low power requirements of the driller's monitor 16, it need not be purged nor is it required to be housed in an explosion proof enclosure.

Figure 11:
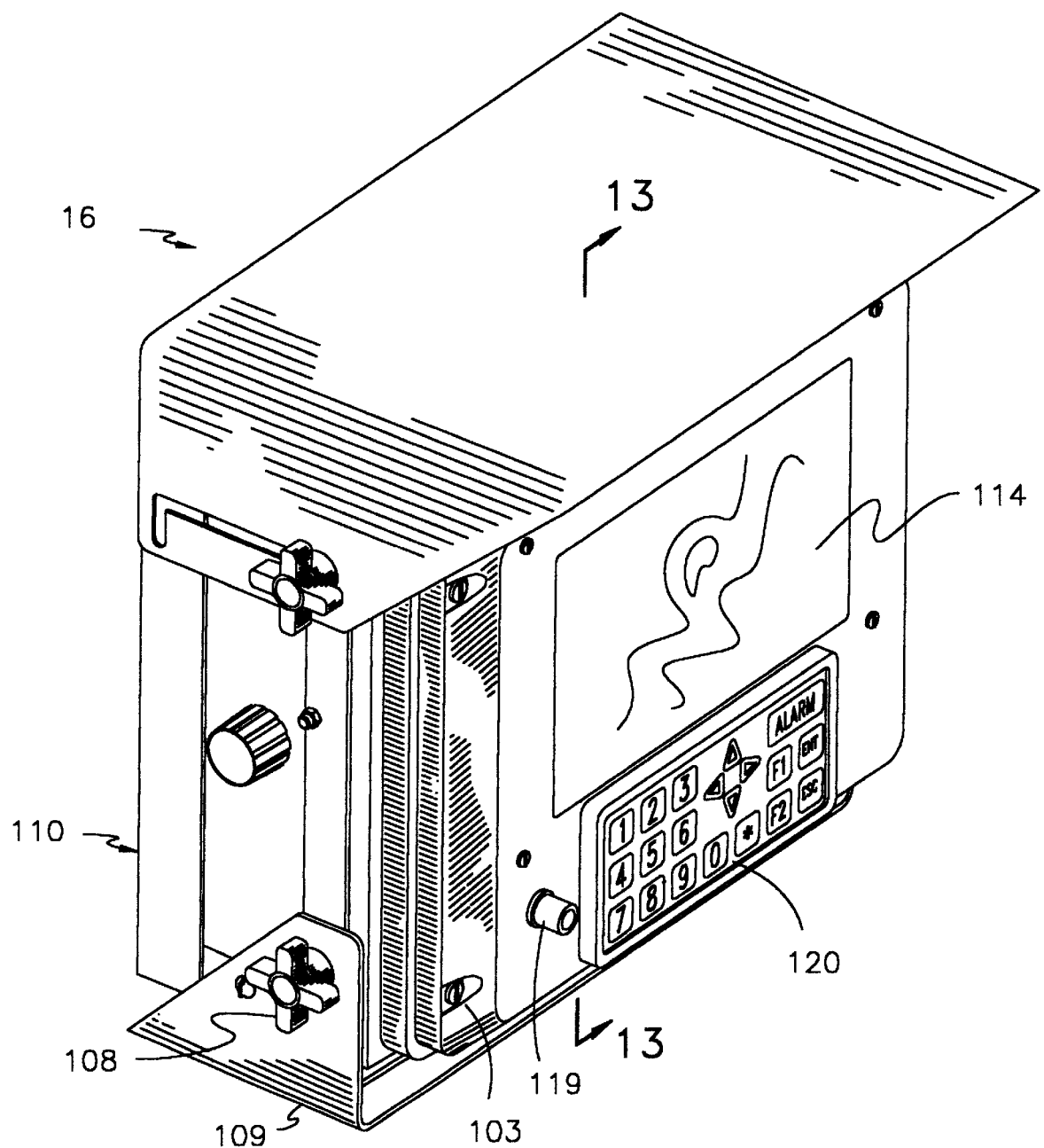
FIGS. 11 and 12 are front and side views, respectively, of the intrinsically safe driller's monitor shown in FIG. 1.
Figure 12:
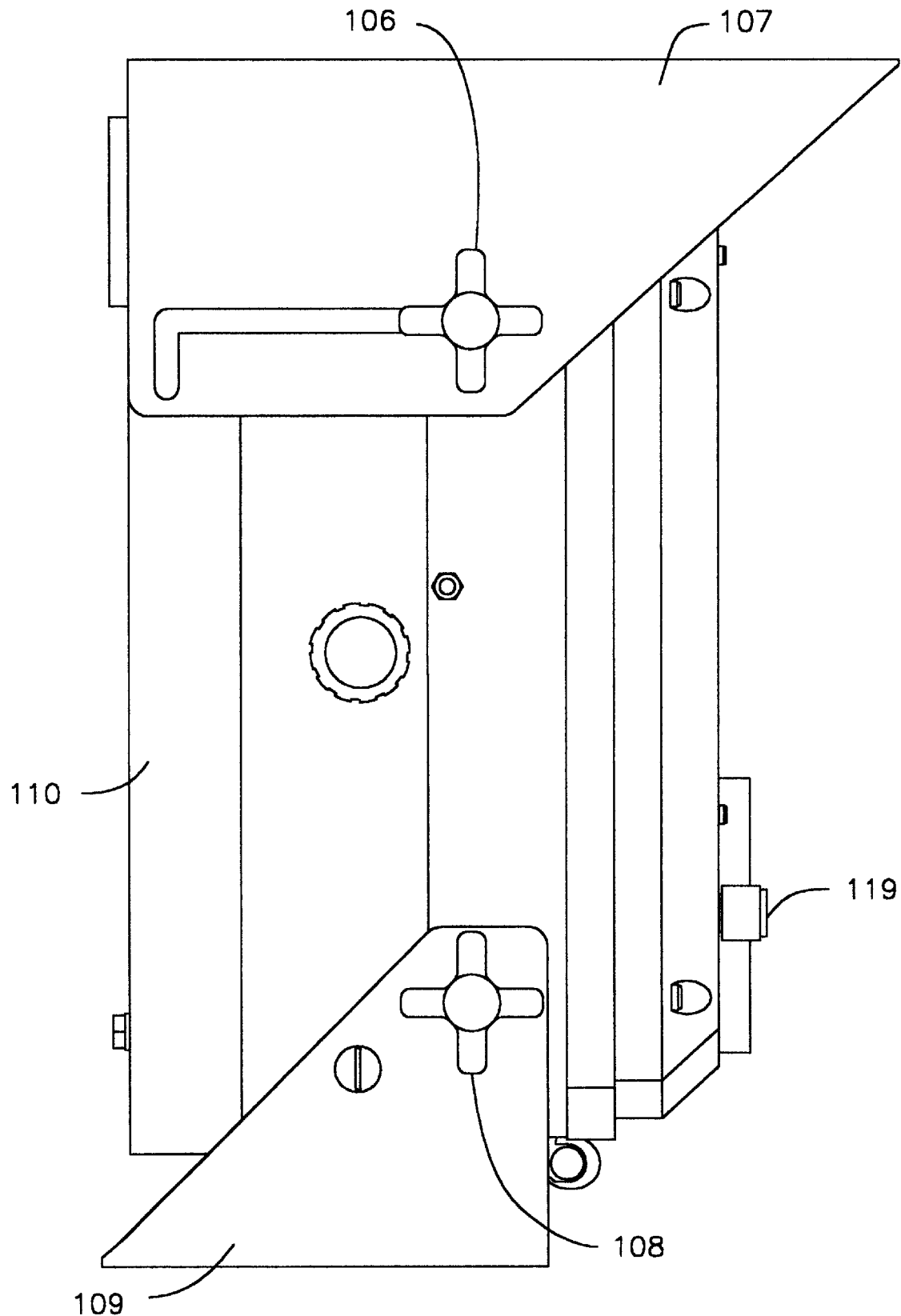
Figure 13:
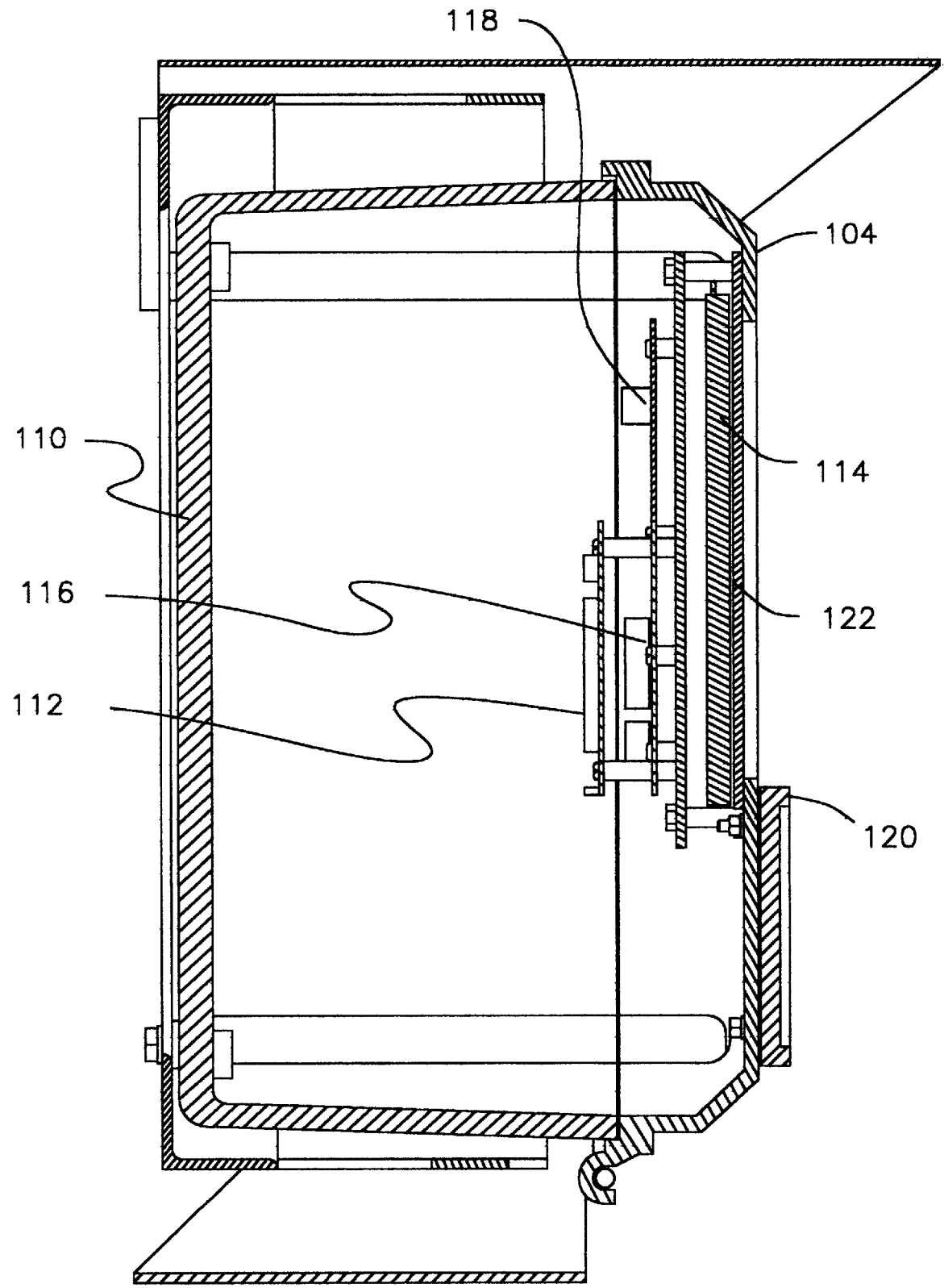
FIG. 13 is a section view of the driller's monitor taken along line 13—13 of FIG. 11.
Figure 14:
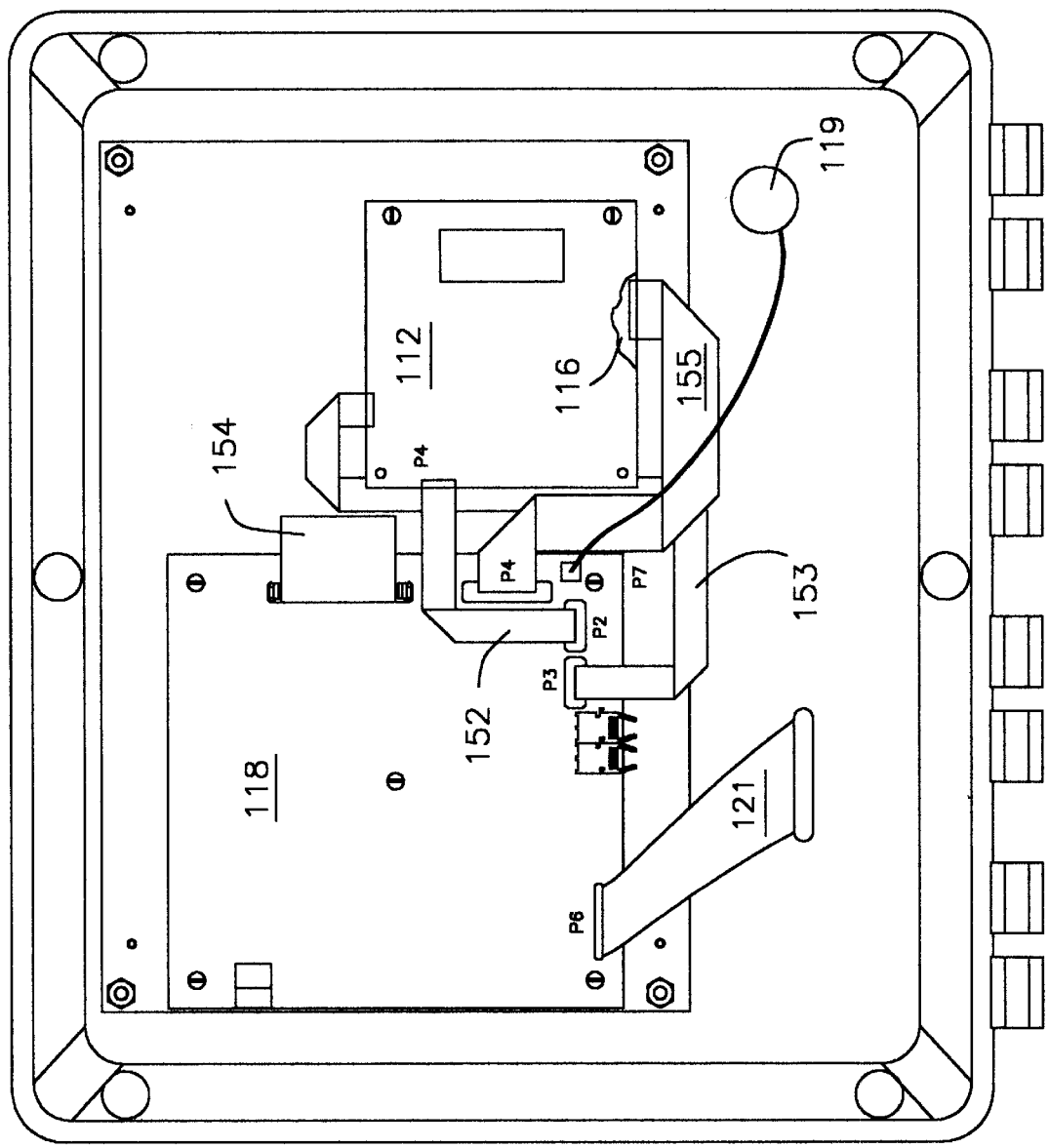
FIG. 14 is an elevation view of the inside of the cover of the driller's monitor shown in FIGS. 11–13 showing the various PCBs and the interconnecting ribbon connectors.

Intrinsically safe driller's monitor 16 is shown in FIGS. 11–16 and various components of monitor 16 are described in detail in Table 16. Referring first to FIGS. 11–13, driller's monitor 16 generally includes a hooded enclosure 110 housing CPU board 112, liquid crystal display (LCD) 114, and LCD driver board 116, monitor interface board 118, and membrane keypad 120. The arrangement of these components within enclosure 110 is best shown in FIGS. 13 and 14.

As with the satellite PCB 52 in satellite boxes 18–20, described previously, all of the printed circuit boards and components located in the intrinsically safe driller's monitor 16 are strategically placed so as to avoid using components that individually could ignite the hazardous vapors, whether by spark or high temperature, during both normal and fault conditions. Also, to meet the CSA intrinsically safe certification, non-surface mount components were used throughout the PCBs on which there was any field wiring in driller's monitor 16 and satellite boxes 18–20. Additionally, capacitors are spaced apart on the board to likewise prevent such occurrences. Accordingly, it is important to the present invention to ensure that in intrinsically safe monitor 16 and satellite boxes 18–20 no capacitor has a capacity greater than 10 microfarads and that no inductor has an inductance greater than 0.88 milihenrys. Likewise, all conducting components on PCB's having any field wiring connections are maintained at a minimum distance apart, such minimum distance being approximately 6.33 millimeters. No component within the driller's box 16 or satellite boxes 18–20 will operate, even in a faulted condition at a temperature exceeding 160° C.

Enclosure 110 is supported on bracket 109 and knobs 108. A hood 107 is movably attached to enclosure 110 by knobs 106. Enclosure 110 is again a blown fiberglass, shielded box that is approximately 14 inches wide, 12 inches high and 6 to 7 inches deep. As shown in FIG. 13, enclosure 110 includes a hinged cover 104. The hinged cover is fastened to the body of enclosure 110 by six threaded fasteners 103. Membrane keypad 120 is adhesively attached to a ¹⁄₁₆ inch thick plate which is secured to the front cover 104 below lens 122 by eight welded studs and nuts and a closed cell neoprene gasket. Lens 122 is a ⅛ inch acrylic sheet manufactured by ICI Acrylics and is held in place with sealing type screws and sealed within cover 104 with General Electric RTV Silicone No. 102 sealant. Lens 122 allows visual observation of internally-mounted LCD 114.

Figure 17:
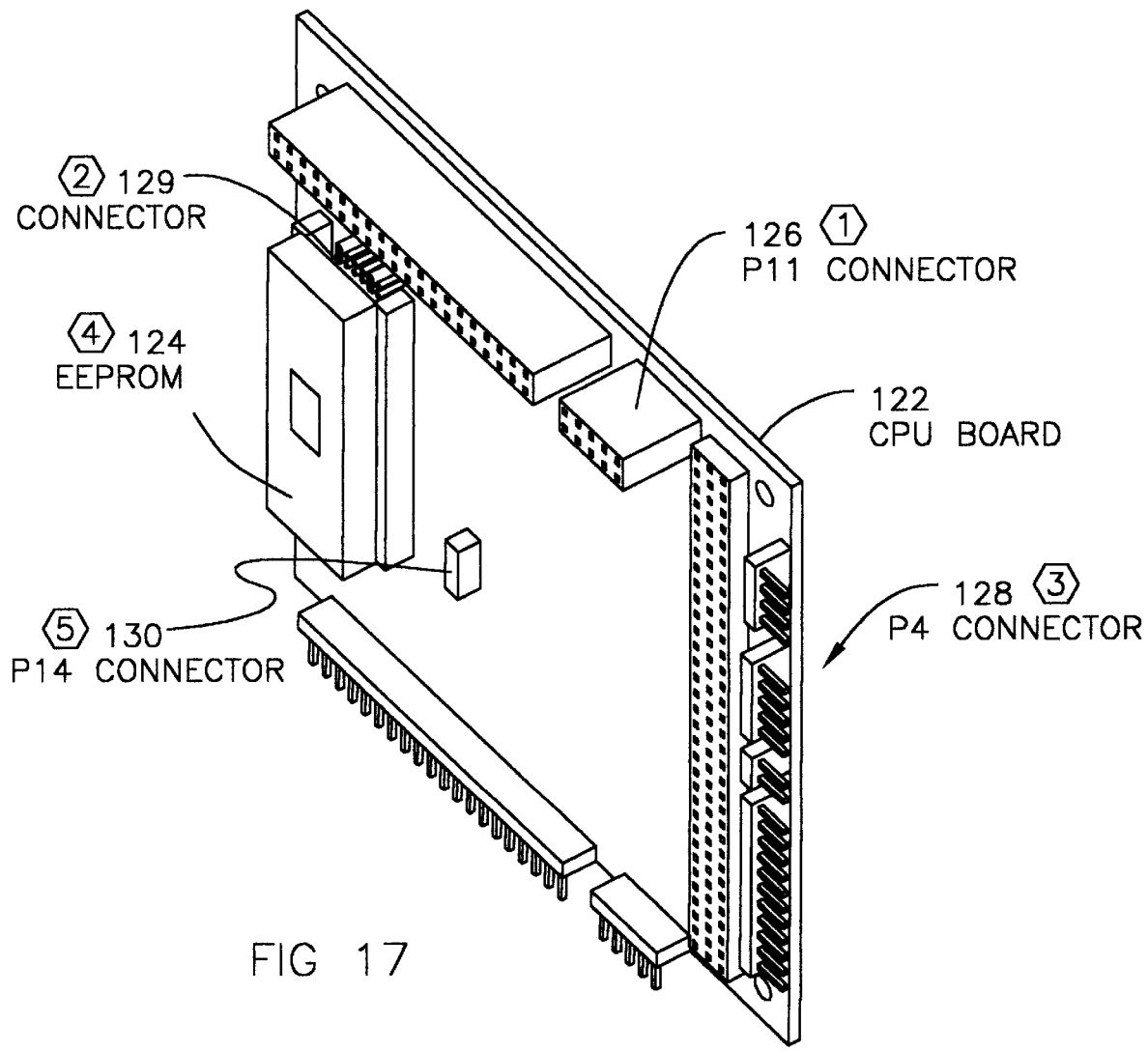
FIG. 17 is a plan elevation view of the CPU board housed in the driller's monitor shown in FIG. 13 and 14.

CPU board 112 is preferably a CPU provided by Real Time Devices, Manufacturer's Part No. SG001-CMF8680. The CPU board 112 is generally shown in FIG. 17. As shown, EEPROM 124 is disposed at one edge of board 112. For use in intrinsically safe driller's monitor 16 of the present application, the board 112 as supplied by Real Time Devices was modified as follows. First, referring to FIG. 17, pin 10 on P11 was clipped off flush with the plastic holder, P11 shown generally by reference number 126. Pin 4 on P4 was likewise clipped off flush with its plastic holder, P4 generally represented by reference number 128. The ROM supplied by Real Time Devices was removed and replaced with an EPROM programmed to have the desired instructions for the particular application of DAS 10. A jumper was removed from P14, designated by reference numeral 130. Additionally, wirewrapped jumpers are added to pins A and D of connector 129. Pins B, C and E of connector 129 are not provided with such jumpers.

Referring again to FIGS. 11 and 13, LCD 114 is preferably a 640×400 high temperature 0.33 dot pitch LCD supplied by Optrex, Inc., Optrex Part No. DMF666AN-10. The maximum operating temperature of the LCD display is ±50° C. It has a maximum supply voltage rating (logic) of 7 volts and a maximum supply voltage (LDC drive) of 30 volts (VCC−VSS) or 28 volts (VCC−VDAJ). The maximum input voltage is VCC+0.3.

The LCD driver board 116 is preferably a PCB manufactured by Ampro Computers, Inc., Manufacturer's Part No.

Figure 18:
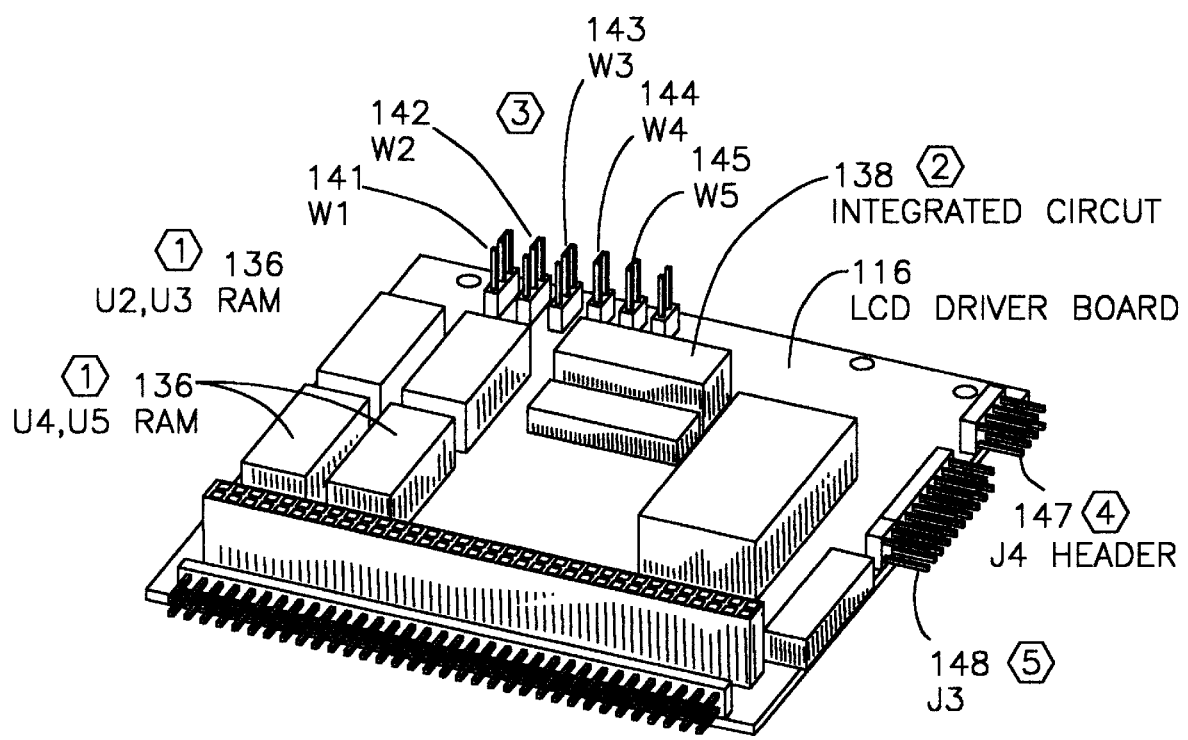
FIG. 18 is a plan view of the LCD driver board housed in the driller's monitor shown in FIGS. 13 and 14.

MMX-LCD-Q-02. The LCD driver board 116 is a compact, low power, multimode LCD display controller module utilizing low power CMOS logic and requiring less than 0.5 watt of power The LCD driver board 116 is best shown in FIG. 18.

Board 116, as supplied by the manufacturer, was specially modified for the present application. Specifically, four RAMs U2–U5 designated by the reference numeral 136 in FIG. 18 were removed from the board and replaced with RAM integrated circuits, 64K×4 bit DIP which consumed lower power, such replacement chips being supplied by manufacturer Intel Corporation, Part No. P21464-10. Additionally, integrated circuit U8 supplied by Ampro and designated in FIG. 18 by reference numeral 138 was removed from driver board 116 and replaced with a 20 pin IC socket and an 8-bit magnitude comparator, supplied by National Semiconductor Corporation, and designated by the manufacturer's Part No. MM74HCT688. Additionally, a wirewrapped jumper was added between pins 1 and 2 on W1-W5, W1-W5 are shown in FIG. 18 by reference number 141–145, respectively. A header J4, shown by reference numeral 147, was removed from board 116 and pin 19 on J3 was clipped flush with the plastic holder, J3 being identified by reference numeral 148.

Figure 15:
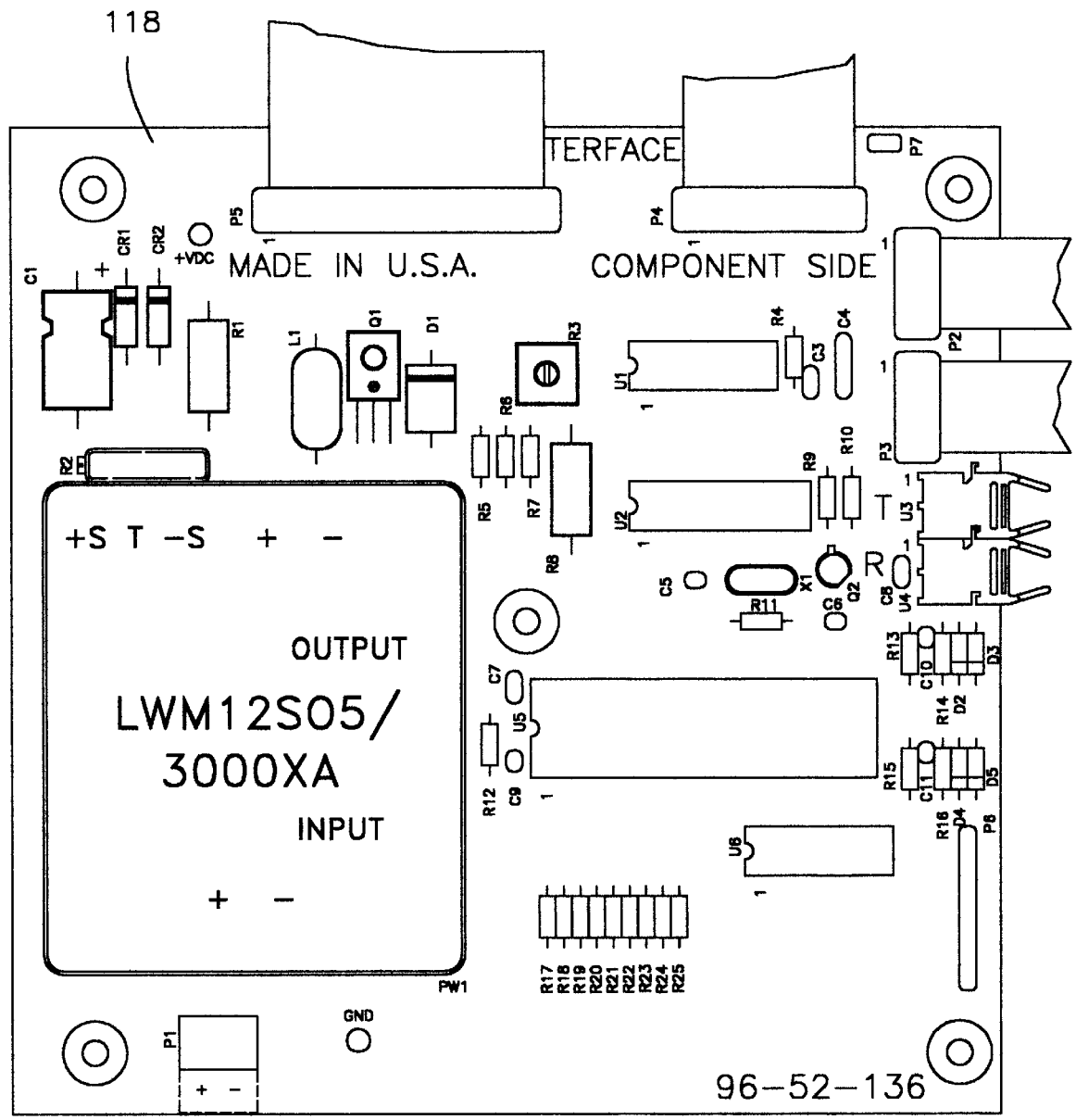
FIG. 15 is a plan view of the monitor interface PCB that is housed in the driller's monitor shown in FIGS. 11–13.
Figure 16:
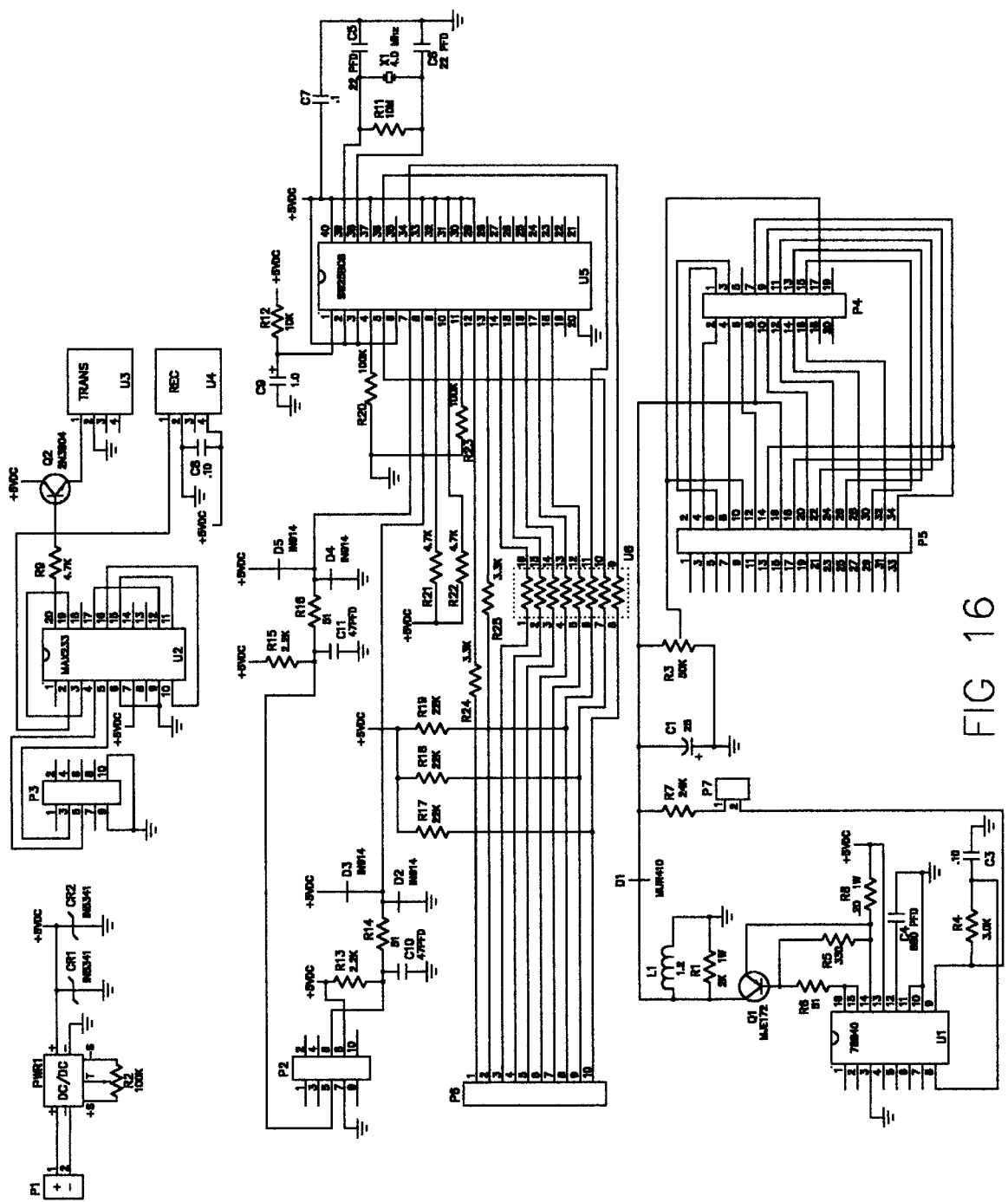
FIG. 16 is an electrical diagram in schematic form, showing the interconnections between the various components on the monitor interface PCB shown in FIG. 15.

The layout of components on the monitor interface board 118 is best shown in FIG. 15, and the circuit diagram of the board is shown in FIG. 16. Table 16 specifically identifies the components employed in monitor interface board 118.

TABLE 16

| DESIGNATOR | QTY | NO. | PART NO. | DESCRIPTION | MAIL REQD |
|---|---|---|---|---|---|
|  | 1 | 49 | LSS00017 | BAG STATIC SHIELDING 8 × 12 FOAM/MACKPAC | 1 |
|  | 1 | 48 | 65-02-017 | CNECTR 2 PIN FEM 12 AWG 5 MM SPACING | 1 |
| P1 | 1 | 47 | 65-02-015 | CNECTR 2 PIN HEADER PCB MNT VERT SHROUDED | 1 |
| CR1,CR2 | 2 | 46 | 74-17-170 | DIODE 1N5341A ZENER 6.2 V 5 W +/- 10% | 2 |
| R23,R20 | 2 | 45 | 72-06-121 | RESIST 100K ¼ W 5% C4 CORNING RLOS104S | 2 |
| X1 | 1 | 44 | 80-06-573 | CRYSTAL 4 MHZ HC-33/U | 1 |
| L1 | 1 | 43 | 80-51-169 | INDUCTOR 1.2 MHENRY AXIAL LEAD | 1 |
| U6 | 1 | 42 | 72-03-285 | RESIST 3.3K OHM NETWORK DIP | 1 |
| R6,R14,R16 | 3 | 41 | 72-06-042 | RESIST ¼ W 51 OHM 5% | 3 |
| R9,R21,R22 | 3 | 40 | YRA14472 | RESIST ¼ W 4700 OHM 5% | 3 |
| R5 | 1 | 39 | YRA14331 | RESIST ¼ W 330 OHM 5% | 1 |
| R4 | 1 | 38 | YRA14302 | RESIST ¼ W 3000 OHM 5% | 1 |
|  | 1 | 37 | YMP00076 | SOCKET IC 20 PIN | 1 |
|  | 1 | 36 | YMP00052 | SOCKET IC 40 PIN TIN LEADS | 1 |
|  | 2 | 35 | YMP00011 | SOCKET IC 16 PIN | 2 |
|  | 2 | 34 | YML00020 | TERMNL UNINS TEST | 2 |
| P7 | 1 | 33 | YKM39020 | CNECTR MALE HEADER 2-PIN 1 IN. PIN SPACE W/LOC | 1 |
| C10,C11 | 2 | 32 | YCM74705 | CAPCTR 47PF MICA 44F6991 | 2 |
| C1 | 1 | 31 | YCB22200 | CAPCTR 22 MFD 25 V | 1 |
| C3,C7,C8 | 3 | 30 | 61-50-007 | CAPCTR 100 V .1 MFD KEMET C330C104MIVICA | 3 |
| C9 | 1 | 29 | YCA30100 | CAPCTR 1 MD 35 V TANT 47F404 | 1 |
| P4 | 1 | 28 | 96-27-050 | CABLE ASSY LCD DRIVE PCB INTERFACE SMART SYSTEM | 1 |
| P2 | 1 | 27 | 96-27-049 | CABLE ASSY KEYBOARD/PWR PCB INTERFACE SMART SYSTEM | 1 |
| P3 | 1 | 26 | 96-27-048 | CABLE ASSY COMMUNICATION SERIAL PCB INTRFC SMART SYSTEM | 1 |
| P5 | 1 | 25 | 96-27-046 | CABLE ASSY LCD PANEL PCB INTERFACE SMART SYSTEM | 1 |
| O1 | 1 | 24 | 74-80-795 | XSISTR MJE172 POWER 3 AMP | 1 |
| O2 | 1 | 23 | 74-78-833 | XSISTR 2N3904 MOTORALA | 1 |
| D1 | 1 | 22 | 74-50-410 | RECTFR MUR410 POWER 4 AMP 100 V | 1 |
| D2–D5 | 4 | 21 | 74-09-363 | DIODE IN914 | 4 |
| R2 | 1 | 20 | 73-74-164 | POT TRIMMER 100K ¾ W 20 TURN PCB MNT HORZ ADJ | 1 |
| R3 | 1 | 19 | 73-74-080 | POT TRIMMER 50K ½ W 1 TURN PCB MNT VERT ADJ | 1 |
| R8 | 1 | 18 | 72-12-392 | RESIST 1 W .2 OHMS 5% WIREWOUND | 1 |
| R1 | 1 | 17 | 72-12-280 | RESIST 1 W 2000 OHM 5% CARBON | 1 |
| R7 | 1 | 16 | 72-06-603 | RESIST ¼ W 24000 OHM 5% CARBON | 1 |
| R24,R25 | 2 | 15 | 72-06-682 | RESIST ¼ W 3300 OHM 5% CARBON | 2 |
| R19,R17,R18 | 3 | 14 | 72-06-177 | RESIST ¼ W 22K OHM 5% CORN C-4 | 3 |
| R11 | 1 | 13 | 72-06-169 | RESIST ¼ W 10 MEG 5% FC | 1 |
| R12 | 1 | 12 | 72-06-097 | RESIST ¼ W 10K OHM 5% C-4 | 1 |
| R13,R15 | 2 | 11 | 72-06-081 | RESIST ¼ W 2.2K OHM 5% C-4 | 2 |
| PW1 | 1 | 10 | 70-74-065 | POWER SUPPLY 7–40 VDC IN/5 VDC OUT 3K MA PCB MNT LO PR | 1 |
| U3 | 1 | 9 | 70-65-065 | TRANSMITTER FIBER OPTIC HORIZ PLASTIC 40K BD PCB | 1 |
| U4 | 1 | 8 | 70-60-065 | RECEIVER FIBER OPTIC HORIZ PLASTIC 40K BD PCB | 1 |
| U5 | 1 | 7 | 67-95-880 | IC ENCODER KEYBOARD | 1 |
| U2 | 1 | 6 | 67-95-513 | IC RS232 LINE DRIVER/RECEIVER | 1 |
| U1 | 1 | 5 | 67-20-069 | IC 78S40 UNIVERSAL SWITCHING REGULATOR | 1 |
| P6 | 1 | 4 | 65-10-056 | CNECTR 10 PIN HEADER PCB MNT RA POLARIZED .1 CEN | 1 |
| C4 | 1 | 3 | 61-55-523 | CAPCTR 680 PFD 200 V CERAMIC MONOLITHIC | 1 |
| C5,C6 | 2 | 2 | 61-55-505 | CAPCTR 22 PFD 200 V CERAMIC MONOLITHIC | 2 |
|  | 1 | 1 | 96-52-135 | PCB BLANK MONITOR INTERFACE BOARD | 1 |

Referring now to FIG. 16 and Table 16, serial connector P3 interconnects monitor interface board 118 with CPU board 112. Integrated circuit package U2 is an RS232 line driver/receiver identical to that previously described with reference to FIGS. 5, 6 and 7 in the intrinsically safe satellite box 18. U2, in conjunction with transistor Q2 and fiber optic transmitters and receivers U3 and U4, also previously described with reference to FIGS. 5, 6 and 7, provide a means for communicating between driller's monitor 16 and master CPU box 12 via fiber optic conductors and composite cable 44 (FIG. 1). Power is received from the master CPU box 12 via barrier box 14 at connector P1, the power more specifically being supplied through high current intrinsically safe barrier 62 shown in FIG. 8. The incoming power is controlled by a wide range DC to DC power supply PW1. PW1 is a 7 to 70 VDC in/5 VDC out supplied by Computer Products, Inc., Part No. LWM12S05/3000XA. The outcoming 5 volt DC is then distributed throughout the monitor interface board 118. Zener diodes CR1, CR2 are rated 6.2 volts 5 watts±10% and are provided to clamp the voltage to ensure that no greater than a maximum voltage of 6.2+10% appears anywhere on the monitor interface board 118.

Keyboard encoder U5 is provided to transmit signals entered on membrane keypad 120 to master CPU box 12. U5 is an IC microcontroller provided by Usar Systems, Inc., designated by Usar as Part No. K25C 81P-SWA. Microcontroller U5 generates a signal transmitted to the keyboard interface on the CPU board 112 via connector P2. Referring now to FIGS. 15 and 16, the membrane keyboard 120 interconnects with interface board 118 via mylar ribbon connector 121. Connector P2 is interconnected with CPU board 112 via ribbon connector 152. Ribbon connector 153 interconnects P3 or LCD driver board 116 with CPU board 112.

Referring again to FIG. 16, monitor interface board 118 further includes a universal switching regulator U1 and inductor L1 which cooperate to provide excitation signals for the LCD 114, such signals being transmitted to LCD 114 through connector P5 and ribbon connector 154 (FIG. 14). This circuitry refreshes the LCD display and prevents flickering which may occur during certain lighting situations. Connector P4 interconnects to video driver board 116 via ribbon connector 155, also shown in FIG. 14.

The driller's monitor 16 is also provided with a potentiometer assembly 119, shown in FIGS. 11, 12 and 14, which is connected to the monitor interface board 118 at connector P7 shown in FIG. 16. This potentiometer provides a brightness control for the LCD display 114. Potentiometer assembly 119 extends through a penetration in enclosure 110 and is sealed with a sealing type locking nut.

Master CPU Box

Referring again to FIG. 1, the master CPU box 12 is the hub of the data acquisition system 10. All communications with and power distribution to the various monitors and satellite boxes are conducted through the master CPU box 12. The CPU box 12 communicates with remote sensors via serial links to acquire data indicating the status of various parameters. It also sends to the monitors all of their display information. The master CPU box 12 also drives circular recorders, such as recorder 26. The master CPU box 12 generally functions as a clearinghouse to distribute information input from any of the monitors to the rest of the systems. It provides storage for the driller's monitor software, calibration values, and system configuration parameters. The master CPU box 12 is itself not intrinsically safe and thus is installed in a nonhazardous or unclassified location.

The master CPU box 12 generally includes and houses an uninterruptable power supply (UPS) 11, a standard industrial slot-board IBM 386AT type PC 13, an interface PCB 161 and an 8-channel breakout PCB 163.

The UPS 11 provides conditioned, noninterruptable power for the entire data acquisition system 10. As understood by those skilled in the art, the UPS 11 powers the system in the event of a disruption of the incoming power to the system. The UPS 11 accepts AC input over a 47 to 63 Hz frequency range. Acceptable input voltage range is 95 to 132 volts AC. The UPS provides the DAS 10 a minimum of 15 minutes of operation time should the incoming AC power source be disrupted. The intrinsically safe driller's monitor 16, the barrier box 14, the intrinsically safe satellite boxes 18–20, all sensors 31–38, and the master CPU box 12 itself, are all supplied by the UPS 11. A UPS suitable for the present invention includes Model No. AT300R as manufactured by Magnum Power Solutions, ltd.

The slot-board PC 13 includes a passive backplane, 386DX-33 CPU board, a RAM/ROM board including EPROM's with software and nonvolatile memory for system calibration, alarm configuration and other data values. The PC 13 further includes an 8-channel serial interface board and a 4-channel D/A board and an 8-channel relay board. Preferably the system will include at least four MB of RAM. The 8-channel serial interface board in PC 13 permits communication between the CPU box 12 and up to eight peripheral devices which include monitors and satellite boxes. In addition to the 8-channel serial interface board, the PC 13 itself includes two serial ports such that the CPU box, in total, includes ten serial ports. The interface board allows standard RS232 serial, 4-wire current loop, and fiber optic communication with the peripherals. Should additional channels be required, the system is expandable by adding additional boards.

The 4-channel D/A board in PC 13 generates voltage signals to drive up to four circular recorders. The 8-channel relay board in PC 13 permits the operation of an audible alarm such as a horn and a visual strobe, either or both of which may indicate alarm conditions. The remaining channels may be used to switch either AC or DC voltage sources that may be present in systems other than that shown in FIG. 1.

Figure 19:
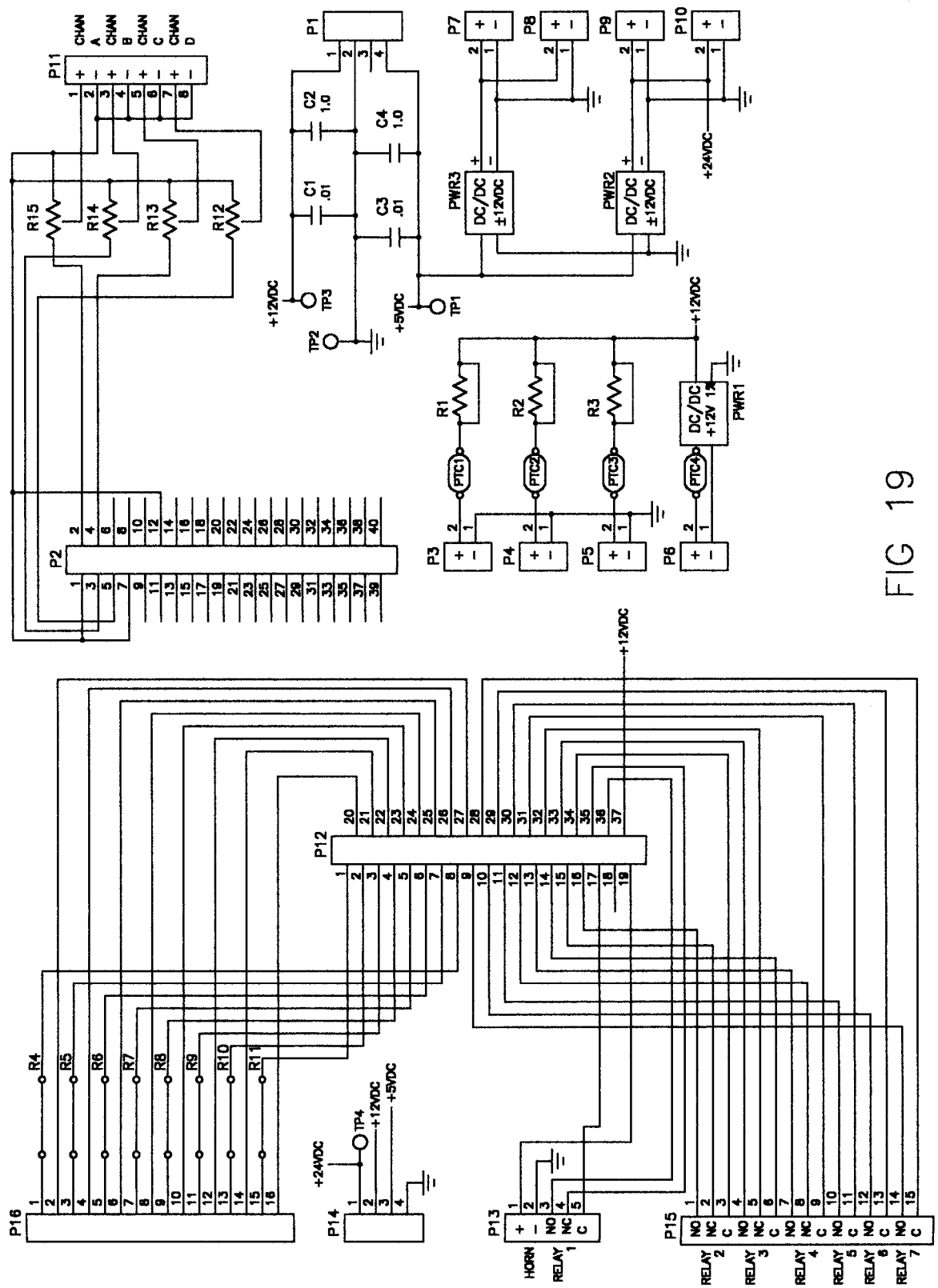
FIG. 19 is an electrical diagram, in schematic form, showing the interconnection of the components of the interface PCB that is housed in the CPU box shown in FIG. 1.

Power is distributed from the CPU box 12 via an interface PCB 161, best understood with reference to FIG. 19 and Table 19.

TABLE 19

| DESIGNATOR | QTY | NO. | PART NO. | DESCRIPTION | MAIL REOD |
|---|---|---|---|---|---|
| | 1 | 24 | LSS00017 | BAG STATIC SHIELDING 10 × 12 ANTI-STATIC FOAM | 1 |
| | 4 | 23 | YML00020 | TERMNL UNINS TEST PT. .090 | 4 |
| C1,C3 | 2 | 22 | YCA31002 | CAPCTR .10 MFD 50 V DIP EPOXY | 2 |
| C2,C4 | 2 | 21 | YCA30100 | CAPCTR 1 MFD 35 V TANT 47F404 | 2 |
| PTC1–PTC4 | 4 | 20 | 75-18-808 | FUSE .45 AMP TRIP .30 AMP HOLD RESETABLE PCB MNT | 4 |
| R12–R15 | 4 | 19 | 73-74-069 | POT TRIMMER 10K ½ W 25 TURN PCB MNT VERT ADJ | 4 |
| PWR2,PWR3 | 2 | 18 | 70-74-081 | PWRSPY 5 VDC IN +/− 12 VDC OUT | 2 |
| PWR1 | 1 | 17 | 70-74-073 | PWRSPY 9–27 VDC IN/12 VDC OUT 1% | 1 |
| P12 | 1 | 16 | 65-37-005 | CNECTR 37 PIN D-SUB MALE PCB MNT | 1 |
| P2 | 1 | 15 | 65-40-056 | HEADER 40 PIN PCB MNT .1 SPAN | 1 |
| | 1 | 14 | 65-16-017 | CNECTR 16 PIN FEM 12 AWG 5 MM SPACING PLUGGABLE | 1 |
| P16 | 1 | 13 | 65-16-015 | CNECTR 16 PIN HEADER PCB MNT VERT SHROUDED | 1 |

TABLE 19-continued

| DESIGNATOR | QTY | NO. | PART NO. | DESCRIPTION | MAIL REOD |
|---|---|---|---|---|---|
|  | 1 | 12 | 65-15-017 | CNECTR 15 PIN FEM 12 AWG 5 MM SPACING PLUGGABLE | 1 |
| P15 | 1 | 11 | 65-15-015 | CNECTR 15 PIN HEADER PCB MNT VERT SHROUDED | 1 |
|  | 1 | 10 | 65-08-017 | CNECTR 8 PIN FEM 12 AWG 5 MM SPACING PLUGGABLE | 1 |
| P11 | 1 | 9 | 65-08-015 | CNECTR 8 PIN HEADER PCB MNT VERT SHROUDED | 1 |
|  | 1 | 8 | 65-90-506 | TERMNL BLOCK PCB CONN 5 PIN | 1 |
| P13 | 1 | 7 | 65-05-025 | HEADER PCB VERT 5 PIN | 1 |
|  | 1 | 6 | 65-90-497 | TERMNL BLOCK PCB CONNECTOR PLUGGABLE 4 PIN | 1 |
| P14 | 1 | 5 | 65-04-015 | CNECTR 4 PIN HEADER PCB MNT VERT SPACING | 1 |
|  | 8 | 4 | 65-02-017 | CNECTR 2 PIN FEM 12 AWG 5 MM SPACING PLUGGABLE | 8 |
| P3–P10 | 8 | 3 | 65-02-015 | CNECTR 2 PIN HEADER PCB MNT VERT SHROUDED | 8 |
| P1 | 1 | 2 | 65-04-025 | CNECTR 4 PIN HEADER PCB MNT VERT DETENT .2 CENT | 1 |
|  | 1 | 1 | 96-52-137 | PCB BLANK J-BOX INTERFACE | 1 |

The interface board 161 receives power at connector P1 from UPS 11. DC to DC power supplies PWR2, PWR3 supply ±12 volts to generate a 24 volt supply to power the 25.5 volt, 328 ohm ISBs 64 located in barrier box 14 as shown in FIG. 8. The 15 volt, 5 ohm, high current ISBs 62, also shown in FIG. 8, receive a 12 volt supply from PCB 161 via connectors P3–P5. Driller's monitor 16 is supplied a 12 volt supply through at DC to DC+12 volt, 1% power supply PWR1 through connector P6. The 12 volts supplied to driller's monitor 16 and satellite boxes 18–20 through barrier box 14 are controlled by PTC1-4 which are 0.45 amp trip resettable fuses made by Raychem Corporation, Part No. RXE030. If an overcurrent is experienced on a circuit supplying those peripherals, the resettable fuse opens, but will reclose once the fault condition has been cured. PWR1 is inserted in the circuit servicing the driller's monitor 16 so as to strictly regulate the 12 volts it receives to ±1%.

Referring still to FIG. 19, connector P12 is an input connector interconnecting an 8-channel relay board in PC 13 with interface board 161. P13 includes a relay for activating horn 22 located in the hazardous area. Horn 22 is interconnected at P13 with cable 45, shown in FIG. 1. P15 includes seven additional relays for other desired functions. For example, relay number 2 may be used to activate a flashing strobe or other visual indicator as may be required by certain regulatory agencies in the event that horn 22 is disabled. Connector P16 is not used in DAS 10 described herein but may be used in conjunction with additional relays in systems where additional relays would be desirable.

Figure 20:
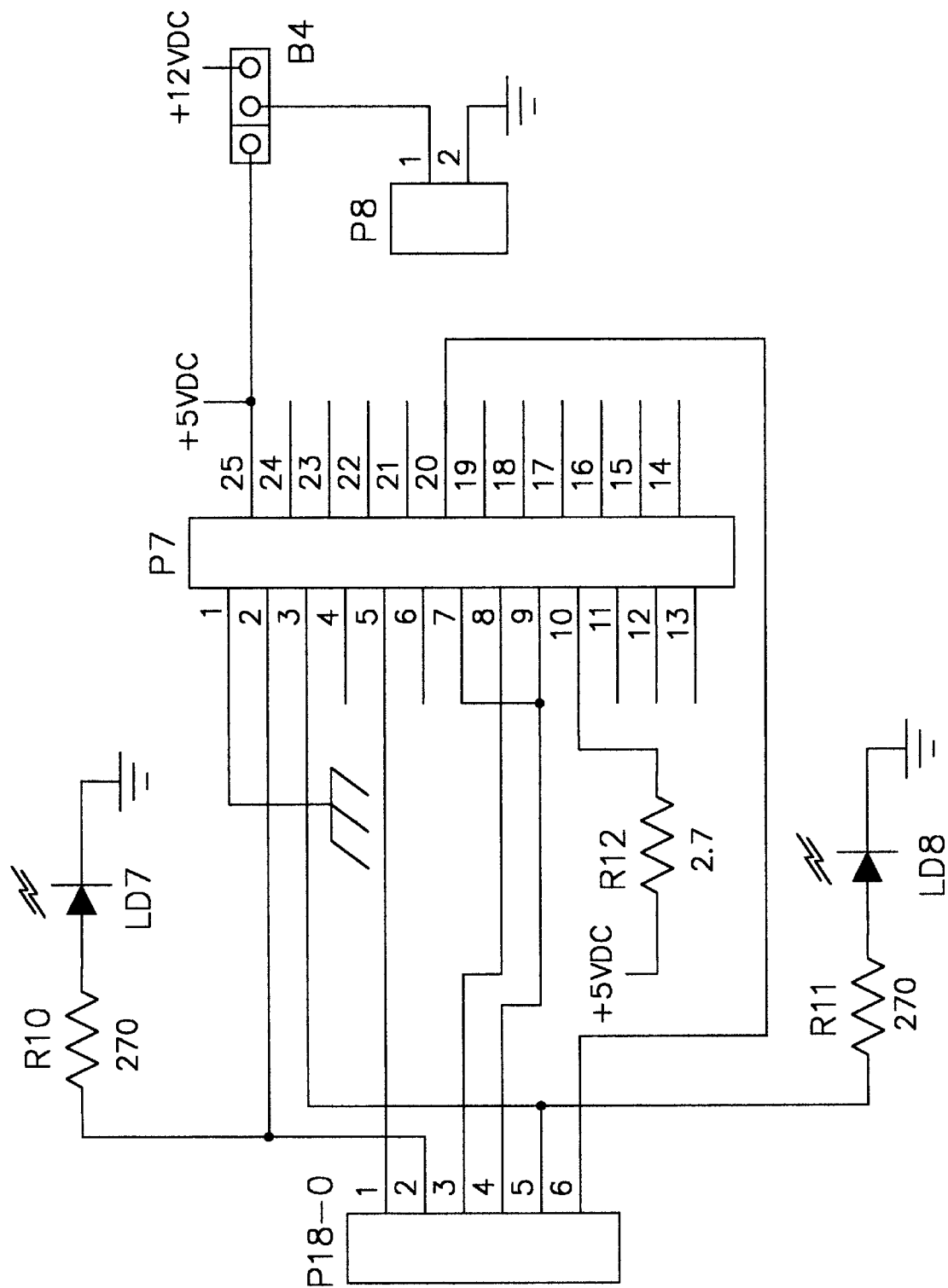
FIG. 20 is an electrical diagram, in schematic form, representative of eight separate circuits contained in the 8-channel breakout PCB housed in the CPU box shown in FIG. 1.

The 8-channel breakout PCB 163 is best understood with reference to FIG. 20 and Table 20.

TABLE 20

| DESIGNATOR | QTY | NO. | PART NO. | DESCRIPTION | MAIL REOD |
|---|---|---|---|---|---|
|  | 1 | 16 | LSS00017 | BAG STATIC SHIELDING 8 × 12 FOAM/MACKPAC | 1 |
|  | 8 | 15 | 65-02-017 | CNECTR 2 PIN FEM 12 AWG 5 MM SPACING PLUGGABLE | 8 |
|  | 8 | 14 | YKH99020 | JUMPER BERG STICK 65474-001 | 8 |
|  | 3 | 13 | YML00020 | TERMNL UNINS TEST PT. .090 | 3 |
| C2,C4 | 2 | 12 | YCA30100 | CAPCTR 1 MFD 35 V TANT 47F704 | 2 |
| C1,C3 | 2 | 11 | 61-50-007 | CAPCTR 100 V .1 MFD KEMET C330C104MICUICA | 2 |
| R3,R6,R9,R12 R15,R18,R21,R24 | 8 | 10 | 72-06-011 | RESIST ¼ W 2.7 OHM 5% LITTLE DEVIL OMITE | 8 |
| B1–B8 | 8 | 9 | YKH99030 | BERG STICK 3 POSITION | 8 |
| LD2,LD4,LD6,LD8 LD10,LD12,LD14,LD16 | 8 | 8 | 68-15-013 | LED RED RECT | 8 |
| LD1,LD3,LD5,LD7,LD9 LD11,LD13,LD15 | 8 | 7 | 68-15-010 | LED GREEN RECT | 8 |
| R1,R2,R4,R5,R7,R8,R10,R11,R13 R14,R16,R17,R19,R20,R22,R23 | 16 | 6 | 72-06-059 | RESIST ¼ W 270 OHM 5% CORNING C4 | 16 |
| P2,P4,P6,P8,P10,P12,P14,P16 | 8 | 5 | 65-02-015 | CNECT 2 PIN HEADER PCB MNT VERT SHROUDED | 8 |
| P1,P3,P5,P7,P9,P11,P13,P15 | 8 | 4 | 65-25-010 | CNCTR 25 PIIN D-SUB MALE PCB MNT | 8 |
| P17 | 1 | 3 | 65-04-025 | CNECTR 4 PIN HEADER PCB MNT VERT DETENT .2 CENT | 1 |
| P18 | 1 | 2 | 65-48-101 | CNECTR 48 PIN HEADER PCB MNT RA MODULAR 8 POS | 1 |
|  | 1 | 1 | 96-52-125 | PCB BLANK 8 CHANNEL BREAKOUT | 1 |

CPU interface board 161 further includes a connector P2 which interconnects board 161 with the D to A PCB in PC 13. Digital signals received by the master CPU box 12 from the satellite boxes 18–20 are converted to analog signals by the D to A converter. These signals are then transmitted to interface board 161 at connector P2 and sent via connector P11 to circular recorder 26 (FIG. 1 ) or up to a total of four such circular recorders, strip charts or other such analog devices. The potentiometers R12 through R15 are supplied in order to scale the 0 to 10 volt signal received from the D to A board in PC13 to a 0 to 5 volt scale, for example.

Power to the board 163 is supplied in the same manner as shown in FIG. 19 with respect to interface board 161. Board 163 includes eight discrete circuits, each of which is identical to the one shown in FIG. 20. The input to each of these circuits is made at connector P18. A separate input is supplied to each of the eight circuits from the eight discrete channels on the 8-channel serial board in the slot board PC 13. A communication module, identical to that previously shown and described with respect to FIGS. 6 and 7, is inserted into P7 which is a 25 pin male connector. The communication module thus provides a means for receiving fiber optically transmitted signals from the intrinsically safe driller's monitor 16 and satellite boxes 18–20, converting those signals to electrical signals and transmitting them to the CPU board in PC13. Likewise, the module converts signals from the CPU in PC 13 into light pulses for transmitting to driller's monitor 16 and satellite boxes 18–20. Each circuit is supplied with a means for monitoring transmissions both to and front the CPU in PC13 by means of LEDs, specifically LD7 and LD8. These LEDs are again troubleshooting devices which allow for quick visual detection of whether communications are being transmitted between the various peripheral devices and the CPU. Power is supplied to the communication module inserted into connector P7 through pin 25. The 5 volts is supplied to pin 10 on P7 to drive LEDs LD7 and LD8.

Summary

The above-described data acquisition system 10 offers many significant advantages over the prior art. First, expensive and bulky explosion proof or purged enclosures are not required for housing the driller's monitor. Further, no installation of purge air piping is required.

Further, because only a single composite cable 41–43 is needed to interconnect a satellite box 18–20 with barrier box 14, as opposed to prior art methods (which would require that a multiconductor cable be used which would include at least one pair of wires for each sensor), the cabling cost and interconnection time care drastically reduced when employing the present invention. The composite cable 41–43 has a small diameter, is light weight and easily installed and is relatively inexpensive. In prior art methods where multiple wire pairs were required to be run long distances from the junction box in the hazardous area back to the barrier box, a large diameter, heavy and bulky multiconductor cable was used. Such cables can be very difficult to install and are relatively expensive.

Additionally, it should be noted that to monitor ten channels in a barrier box using the present invention, only a single high current ISB 62 is required (although the 24 volt/328 ohm ISB 64 is included for added flexibility in the type of sensors which can be monitored). Thus, considering two ISBs per satellite box, only a fifth of the barriers conventionally required are utilized in the present invention. This offers significant cost savings.

An additional important advantage is provided by the satellite box 18 including a power conditioning circuit to remove electrical contamination before power is supplied to each sensor. Additionally, the present invention eliminates a previously existing problem of electrical noise being induced into the multiconductor cable connecting the junction box within the hazardous barrier to the barrier box in a nonhazardous area. Using the present invention, the microcontroller U5 on the satellite PCB 52 performs the required analog to digital conversion, provides the rate calculations and accumulation of event pulses, and transmits that data stream from the hazardous area to the barrier box in the intrinsically safe area via the fiber optic conductors. Thus, the present invention eliminates the opportunity for electrical noise to be induced in the communication means interconnecting the barrier box and the satellite box. An added advantage of performing the various analog to digital conversions and calculations within the satellite box is that the other system components, especially the master CPU box 12, operate more efficiently by removing a significant number of calculations from its required functions.

What is claimed is:

1. An intrinsically safe monitoring device for use in a hazardous area, comprising:

an enclosure;
a CPU board mounted in said enclosure;
a video display screen in said enclosure;
a video driver board in said enclosure for supporting said video display;
a data input device mounted on said enclosure for providing communication with said internal CPU board;
wherein said CPU board, said video driver board and display screen, and said data input device are each intrinsically safe for class 1, division 1, group C and D areas.

2. The intrinsically safe monitoring device according to claim 1 wherein said monitor has a Temperature Code T3C for class 1, Division I, Groups C & D hazardous locations.

3. The intrinsically safe monitoring device according to claim 1 wherein the components of said monitoring device have a maximum surface temperature of 160° C. under fault conditions at an ambient temperature of 40° C.

4. The intrinsically safe monitoring device according to claim 1 wherein said monitoring device comprises a plurality of capacitors in said enclosure, and wherein each of said capacitors has a capacitance not greater than 10 microfarads.

5. The intrinsically safe monitoring device according to claim 1 wherein said monitoring device comprises a plurality of inductors in said enclosure, and wherein each of said inductors has an inductance not greater than 0.88 millihenrys.

6. The intrinsically safe monitoring device according to claim 1 wherein said video drive board has a power requirement of less than 0.5 watt.

7. An intrinsically safe data collection box for installation in a hazardous area that includes a plurality of intrinsically safe sensors located therein, said collection box comprising:

an enclosure;
a PCB mounted in said enclosure, said PCB including:
 a receiver for receiving analog signals from the sensors;
 a signal conditioner capable of conditioning said received signals;
 a signal converter capable of converting said received signals to digital signals;
 a data processor capable of calculating data from said converted signals;
 a signal transmitter capable of transmitting said digital signals and said calculated data to a location outside said hazardous area via a single communication channel; and
 a power distributor capable of receiving power from outside the hazardous area and redistributing power to the sensors;
wherein said PCB is intrinsically safe for class 1, division 1, group C and D areas.

8. The intrinsically safe data collection box according to claim 7 wherein said data processor includes an on-board CPU.

9. The intrinsically safe data collection box according to claim 8 further comprising a read only memory, said read only memory storing the operating instructions for said CPU.

10. The intrinsically safe data collection box according to claim 7 further comprising a dedicated voltage regulator for each sensor.

11. The intrinsically safe data collection box according to claim 7 wherein said data collection box has a temperature code T3C for class 1, Division 1, Group C and D areas.

12. The intrinsically safe data collection box according to claim 7 wherein the maximum surface temperature of the components in said enclosure under fault conditions is 160° C. at 40° C. ambient temperature.

13. The intrinsically safe data collection box according to claim 7 wherein said power distributor and said signal transmitter comprise a composite cable having at least one fiber optic conductor and at least one pair of electrical conductors.

14. The data acquisition system according to claim 7 wherein said monitoring device comprises a plurality of capacitors in said enclosure, and wherein each of said capacitors has a capacitance not greater than 10 microfarads.

15. The intrinsically safe data collection box according to claim 7 wherein said monitoring device comprises a plurality of inductors in said enclosure, and wherein each of said inductors has an inductance not greater than 0.88 millihenrys.

* * * * *